United States Patent
Bae et al.

(10) Patent No.: US 10,652,591 B2
(45) Date of Patent: May 12, 2020

(54) SYSTEM FOR CLOUD STREAMING SERVICE, METHOD FOR SAME USING STILL-IMAGE COMPRESSION TECHNIQUE AND APPARATUS THEREFOR

(71) Applicant: SK PLANET CO., LTD., Seongnam-si, Gyeonggi-Do (KR)

(72) Inventors: Tae-Meon Bae, Seoul (KR); Hong-Seo Yun, Incheon (KR); Hyun-Sik Na, Bucheon-si (KR); Dong-Gook Kim, Suwon-si (KR); Yoo-Ri Jung, Daejeon (KR); Dong-Su Lee, Seongnam-si (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 171 days.

(21) Appl. No.: 15/420,030

(22) Filed: Jan. 30, 2017

(65) Prior Publication Data
US 2017/0142452 A1    May 18, 2017

Related U.S. Application Data

(63) Continuation of application No. PCT/KR2015/006950, filed on Jul. 6, 2015.

(30) Foreign Application Priority Data

Jul. 30, 2014 (KR) .................. 10-2014-0097322
Oct. 2, 2014 (KR) .................. 10-2014-0133176
(Continued)

(51) Int. Cl.
G06K 9/46      (2006.01)
H04N 21/234    (2011.01)
(Continued)

(52) U.S. Cl.
CPC ......... *H04N 21/234* (2013.01); *G06F 3/1415* (2013.01); *H04L 65/602* (2013.01);
(Continued)

(58) Field of Classification Search
CPC ........ H04N 21/234; H04N 19/12; H04N 7/50; H04L 67/10
See application file for complete search history.

(56) References Cited

U.S. PATENT DOCUMENTS 7,433,521 B2   10/2008   Chen et al.
7,769,083 B2    8/2010   Maeda et al.
(Continued)

FOREIGN PATENT DOCUMENTS

CN    101883281 A    11/2010
GB      2486475 A     6/2012
(Continued)

OTHER PUBLICATIONS

International Search Report for application No. PCT/KR2015/006950 dated Oct. 20, 2015.
(Continued)

*Primary Examiner* — Solomon G Bezuayehu
(74) *Attorney, Agent, or Firm* — Fenwick & West LLP

(57) ABSTRACT

The present invention relates to a system for a cloud streaming service, a method for same using a still-image compression technique and an apparatus therefor, particularly the method allowing a still image-based cloud streaming service by comparing the previous frame and current frame to determine and capture the region in the current frame which has changed from the previous frame, and transmitting, to a user, the changed region encoded with the still-image compression technique. By utilizing a still-image compression technique appropriate to the image type when providing the cloud streaming service, the compression
(Continued)

efficiency of the still image and the speed of the cloud streaming service can be improved.

5 Claims, 15 Drawing Sheets

(30) Foreign Application Priority Data

| Oct. 6, 2014 | (KR) | ......................... 10-2014-0134512 |
|---|---|---|
| Oct. 13, 2014 | (KR) | ......................... 10-2014-0137733 |
| Oct. 20, 2014 | (KR) | ......................... 10-2014-0141983 |

(51) Int. Cl.

| H04L 29/06 | (2006.01) |
|---|---|
| H04N 19/507 | (2014.01) |
| G06F 3/14 | (2006.01) |
| H04N 19/136 | (2014.01) |
| H04N 19/17 | (2014.01) |
| H04N 19/12 | (2014.01) |
| H04N 19/129 | (2014.01) |
| H04N 19/172 | (2014.01) |
| H04N 19/182 | (2014.01) |
| H04L 29/08 | (2006.01) |
| H04N 21/222 | (2011.01) |
| H04N 21/236 | (2011.01) |

(52) U.S. Cl.
CPC ............ *H04L 67/10* (2013.01); *H04N 19/12* (2014.11); *H04N 19/129* (2014.11); *H04N 19/136* (2014.11); *H04N 19/17* (2014.11); *H04N 19/172* (2014.11); *H04N 19/182* (2014.11); *H04N 19/507* (2014.11); *H04N 21/222* (2013.01); *H04N 21/23605* (2013.01); *G09G 2320/0613* (2013.01); *G09G 2340/02* (2013.01); *G09G 2360/08* (2013.01)

(56) References Cited

U.S. PATENT DOCUMENTS

| 7,813,570 | B2 | 10/2010 | Shen et al. |
|---|---|---|---|
| 7,949,053 | B2 | 5/2011 | Makai et al. |
| 8,213,730 | B2 | 7/2012 | Kawazoe et al. |
| 2001/0001019 | A1* | 5/2001 | Kadono ............... H04N 19/503 382/277 |
| 2005/0123042 | A1* | 6/2005 | Park ............... H04N 21/234309 375/240.12 |
| 2009/0097751 | A1* | 4/2009 | McDowell ............ G06F 15/177 382/181 |
| 2009/0100125 | A1* | 4/2009 | McDowell ............ H04L 65/607 709/203 |
| 2009/0100483 | A1* | 4/2009 | McDowell .............. G06F 9/451 725/109 |
| 2013/0155075 | A1 | 6/2013 | Matsui et al. |
| 2013/0163812 | A1 | 6/2013 | Mukasa |
| 2014/0043347 | A1* | 2/2014 | Lee ............................ G06T 1/20 345/522 |
| 2014/0043358 | A1* | 2/2014 | Wang ......................... G06T 9/00 345/619 |
| 2015/0117545 | A1* | 4/2015 | Fu ........................... H04N 19/30 375/240.18 |
| 2015/0278149 | A1* | 10/2015 | Kogan ............... H04N 21/4122 710/52 |
| 2015/0334398 | A1* | 11/2015 | Socek ........................ G06T 7/11 375/240.26 |
| 2015/0373075 | A1* | 12/2015 | Perlman ................ H04L 65/608 709/217 |
| 2016/0328827 | A1* | 11/2016 | Ilic ........................ G06K 9/6211 |
| 2017/0032491 | A1* | 2/2017 | Ju ........................... H04N 19/00 |

FOREIGN PATENT DOCUMENTS

| JP | 2005-033762 A | 2/2005 |
|---|---|---|
| JP | 2005-287035 A | 10/2005 |
| JP | 2006-094494 A | 4/2006 |
| JP | 2006-519533 A | 8/2006 |
| JP | 2008-040529 A | 2/2008 |
| JP | 2010-004434 A | 1/2010 |
| JP | 2010-055280 A | 3/2010 |
| JP | 2010-119030 A | 5/2010 |
| JP | 2013-126185 A | 6/2013 |
| JP | 2013-131990 A | 7/2013 |
| KR | 1020100030833 A | 3/2010 |
| KR | 1020120105688 A | 9/2012 |
| KR | 1020130011714 A | 1/2013 |
| KR | 1020130034623 A | 4/2013 |
| KR | 1020130134623 A | 12/2013 |
| KR | 1020140021388 A | 2/2014 |
| KR | 1020140027040 A | 3/2014 |
| KR | 1020140034603 A | 3/2014 |
| KR | 1020140045013 A | 4/2014 |
| KR | 1020140093849 A | 7/2014 |

OTHER PUBLICATIONS

A partial supplementary European search report dated Feb. 28, 2018 in connection with the counterpart European Patent Application No. 15827254.2.

* cited by examiner

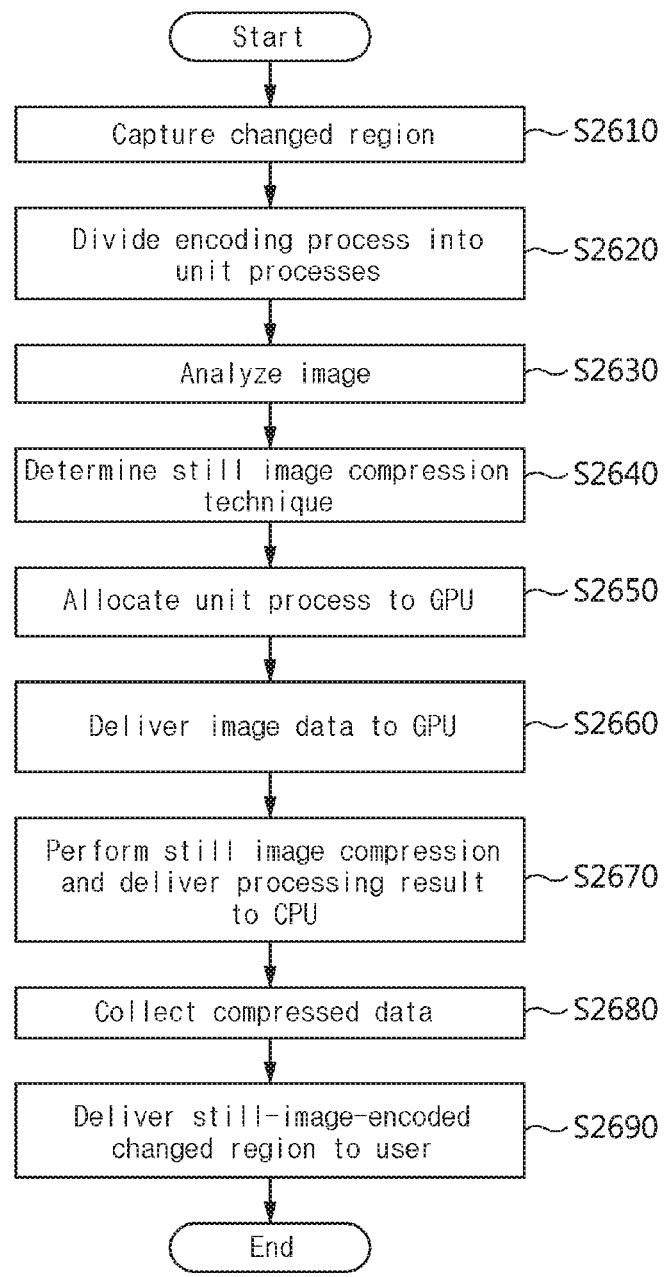

SYSTEM FOR CLOUD STREAMING SERVICE, METHOD FOR SAME USING STILL-IMAGE COMPRESSION TECHNIQUE AND APPARATUS THEREFOR

CROSS REFERENCE TO RELATED APPLICATION

The present application is a continuation of International Application No. PCT/KR2015/006950, filed Jul. 6, 2015, which is based upon and claims the benefit of priority to Korean Patent Application No. 10-2014-0097322, filed on Jul. 30, 2014 and Korean Patent Application No. 10-2014-0133176 filed on Oct. 2, 2014 and Korean Patent Application No. 10-2014-0134512, filed on Oct. 6, 2014 and Korean Patent Application No. 10-2014-0137733, filed on Oct. 13, 2014 and Korean Patent Application No. 10-2014-0141983 filed on Oct. 20, 2014. The disclosure of the above-listed applications is hereby incorporated by reference herein in its entirety.

TECHNICAL FIELD

The present invention relates to a cloud streaming service system, a cloud streaming service method using a still image compression technique, and a related apparatus. More particularly, the present invention relates to a cloud streaming service system, method and apparatus for increasing a service speed by applying a still image compression technique to only a changed region between a previous frame and a current frame, for saving a system resource for image processing by determining an encoding technique through image feature information, for effectively using a server resource by selecting an encoding processing unit depending on an image feature, and for saving a server resource by separately performing an encoding process according to an encoding processing unit.

BACKGROUND ART

A cloud streaming service basically applies a cloud streaming technique based on a video codec. Therefore, in case of a menu display or the like, the cloud streaming service is inefficient because of unnecessarily capturing the entire screen and encoding with the video codec.

Namely, as to a screen in which static images are slightly changed in response to a user input, an image-based cloud streaming service may be more efficient than a cloud streaming service using the video codec.

In other words, when a cloud streaming service based on a still image is performed, it is more efficient to detect a region changed between frames and then transmit such a minimum region only.

However, in case of applying a still image codec, the amount of data may be considerably varied depending on the type of an image to be compressed. Also, the efficiency of a cloud streaming service may be significantly varied depending on the still image compression technique used for compression. Therefore, a new technique for quickly and exactly identifying an image type and then adaptively applying an image cloud is required.

Additionally, for performing a cloud streaming service based on a still image, it is very important to exactly detect a region at which a change between frames occurs. Therefore, a technique for detecting such a changed region more simply and more effectively is also required.

Furthermore, cable and IPTV providers have supplied various types of set-Further, as cable or IPTV providers have been supplying various kinds of set-top boxes for a long time, there are wide differences in performance between such set-top boxes. In fact, more than 15 types of set-top boxes have been introduced in recent 10 years. The difference in performance between a good set-top box and a bad set-top box is so large that a content provider may not be able to provide contents to a user in a desired manner.

Besides, in case of a cloud streaming service based on a still image, web application developers who write a code for a web application want to write the code in the same way they used to be, whereas a cloud streaming server wants a code, to which no animation is applied, containing only information about an image requiring to be captured and information corresponding to the properties of animation. Namely, in order to provide a code desired by a CS server, web application developers need to write the code in a new way, rather than the way they used to be.

Relevant techniques are disclosed in Korean Patent Publication Nos. 10-2014-0027040 (Title: Adaptive predictive image compression system and method thereof), published on Mar. 6, 2014, 10-2014-0045013 (Title: Method and apparatus for encoding a cloud display screen by using API information), published on Apr. 16, 2014, 10-2012-0105688 (Title: System and method for virtualization service between server/client terminal of heterogeneous computing types), published on Sep. 26, 2012, and 10-2014-0021388 (Title: Apparatus and method for JPEG2000 encoding/decoding based on GPU), published on Feb. 20, 2014.

DISCLOSURE

Technical Problem

An object of the present invention is to improve compression efficiency and a service speed in a cloud streaming service by using a suitable still image compression technique for context when a cloud streaming service based on a still image is provided.

Additionally, an object of the present invention is to improve compression efficiency and a service speed in a cloud streaming service by using a suitable still image compression technique for an image type when a cloud streaming service based on a still image is provided.

Additionally, an object of the present invention is to provide a faster cloud streaming service to more users over the same band by maximizing the efficiency of streaming compression through a cloud streaming service based on a still image.

Additionally, an object of the present invention is to provide a faster cloud streaming service to more users over the same band by applying a still image compression technique to a changed region between a current frame and a previous frame when a cloud streaming service using a still image compression technique is provided.

Additionally, an object of the present invention is to rapidly detect a target for still image compression by determining a changed region through a scanning of a differential frame between a current frame and a previous frame when a cloud streaming service using a still image compression technique is provided.

Additionally, an object of the present invention is to construct an efficient cloud streaming server capable of saving server resources, typically required for image processing, by determining an encoding technique based on image feature information created using an application source code and an MPEG texture descriptor.

Additionally, an object of the present invention is to provide a cloud streaming service to a user more quickly by reducing a service time, required for image processing, through a still image encoding based on image feature information.

Additionally, an object of the present invention is to reduce the processing cost of a cloud streaming service by improving the efficiency of the cloud streaming service.

Additionally, an object of the present invention is to reduce the use of resources at a cloud streaming server by separately performing an encoding process through different encoding processing units when a cloud streaming service is provided.

Additionally, an object of the present invention is to reduce a delay situation, which may be caused due to a server load, by using a graphics processing unit together with a central processing unit when a cloud streaming service is provided.

Technical Solution

In order to accomplish the above objects, a cloud streaming server according to an embodiment of the present invention comprises a changed region determining unit configured to determine a changed region of a current frame changed from a previous frame by comparing the current frame with the previous frame; a capture unit configured to capture the changed region; an encoding unit configured to perform a still image encoding of the changed region corresponding to one frame by using a still image compression technique; and a sending unit configured to perform a cloud streaming service based on a still image by sending the still-image-encoded changed region to a user.

In the cloud streaming server, the changed region determining unit may be further configured to calculate a differential frame between the previous frame and the current frame, and to determine the changed region by using the differential frame.

In the cloud streaming server, the changed region determining unit may be further configured to determine the changed region by detecting a changed pixel of the current frame changed from the previous frame through a scanning of the differential frame.

In the cloud streaming server, the changed region determining unit may be further configured to determine the changed region containing changed pixels detected through a horizontal scanning and a vertical scanning of the differential frame.

In the cloud streaming server, the changed region determining unit may be further configured to obtain a first vertical coordinate element from a changed pixel firstly detected through the horizontal scanning of the differential frame on a row-by-row basis from top to bottom, to obtain a second vertical coordinate element from a changed pixel firstly detected through the horizontal scanning of the differential frame on a row-by-row basis from bottom to top, to obtain a first horizontal coordinate element from a changed pixel firstly detected through the vertical scanning of the differential frame on a column-by-column basis from left to right, to obtain a second horizontal coordinate element from a changed pixel firstly detected through the vertical scanning of the differential frame on a column-by-column basis from right to left, and to determine, as the changed region, a rectangular region containing a changed pixel corresponding to a coordinate formed by a pair of one of the horizontal coordinate elements and one of the vertical coordinate elements.

In the cloud streaming server, the changed region determining unit may be further configured to determine, as the changed region, a rectangular region containing the changed pixels and having the minimum area.

In the cloud streaming server, the changed region determining unit may be further configured to determine, as the changed region, a rectangular region having, as vertices, four coordinates each of which is formed by a pair of one of the horizontal coordinate elements and one of the vertical coordinate elements.

Additionally, a cloud streaming service method using a still image compression technique according to an embodiment of the present invention comprises steps of determining a changed region of a current frame changed from a previous frame by comparing the current frame with the previous frame; capturing the changed region; performing a still image encoding of the changed region corresponding to one frame by using a still image compression technique; and performing a cloud streaming service based on a still image by sending the still-image-encoded changed region to a user.

In the method, the step of determining the changed region may include calculating a differential frame between the previous frame and the current frame, and determining the changed region by using the differential frame.

In the method, the step of determining the changed region may include determining the changed region by detecting a changed pixel of the current frame changed from the previous frame through a scanning of the differential frame.

In the method, the step of determining the changed region may include determining the changed region containing changed pixels detected through a horizontal scanning and a vertical scanning of the differential frame.

In the method, the step of determining the changed region may include obtaining a first vertical coordinate element from a changed pixel firstly detected through the horizontal scanning of the differential frame on a row-by-row basis from top to bottom, obtaining a second vertical coordinate element from a changed pixel firstly detected through the horizontal scanning of the differential frame on a row-by-row basis from bottom to top, obtaining a first horizontal coordinate element from a changed pixel firstly detected through the vertical scanning of the differential frame on a column-by-column basis from left to right, obtaining a second horizontal coordinate element from a changed pixel firstly detected through the vertical scanning of the differential frame on a column-by-column basis from right to left, and determining, as the changed region, a rectangular region containing a changed pixel corresponding to a coordinate formed by a pair of one of the horizontal coordinate elements and one of the vertical coordinate elements.

In the method, the step of determining the changed region may include determining, as the changed region, a rectangular region containing the changed pixels and having the minimum area.

In the method, the step of determining the changed region may include determining, as the changed region, a rectangular region having, as vertices, four coordinates each of which is formed by a pair of one of the horizontal coordinate elements and one of the vertical coordinate elements.

Additionally, a cloud streaming server according to another embodiment of the present invention comprises a capture unit configured to capture a changed region contained in a changed frame; an encoding unit configured to determine an encoding technique by considering whether there is image feature information corresponding to the changed region, and to perform a still image encoding of the changed region by using the encoding technique; and a sending unit configured to perform a cloud streaming service based on a still image by sending the still-image-encoded changed region to a user.

In the cloud streaming server, the image feature information may be created based on an application source code or created using an MPEG texture descriptor.

In the cloud streaming server, the encoding unit may be further configured to determine the encoding technique based oil the image feature information if there is the image feature information, and to determine the encoding technique by analyzing an image corresponding to the changed region if there is no image feature information.

In the cloud streaming server, the encoding technique may correspond to one of PNG (portable network graphics), paletted PNG (portable network graphics) and JPEG (joint photography experts group).

In the cloud streaming server, the encoding unit may be further configured to identify the changed region as one of a normal region and a picture region by analyzing the image corresponding to the changed region, and to determine the encoding technique by considering at least one of an image processing result of the normal region and an image type of the picture region.

In the cloud streaming server, the image type may correspond to one of a natural image and a synthetic image.

In the cloud streaming server, the capture unit may be further configured to capture, as the changed region, a specific region changed in a screen area corresponding to the changed frame in comparison with a screen area corresponding to the previous frame.

In the cloud streaming server, the capture unit may be further configured to detect a section having a smaller frame change in all frames to be transmitted to a terminal device of the user, and to capture the changed region in the detected section.

In the cloud streaming server, the capture unit may be further configured to detect the section having a smaller frame change by sensing an event type of an application occurring at the terminal device of the user.

Additionally, a cloud streaming service method using source information according to the present invention comprises steps of capturing a changed region contained in a changed frame; determining an encoding technique by considering whether there is image feature information corresponding to the changed region, and performing a still image encoding of the changed region by using the encoding technique; and performing a cloud streaming service based on a still image by sending the still-image-encoded changed region to a user.

In the method the image feature information may be created based on an application source code or created using an MPEG texture descriptor.

In the method, the encoding step may include determining the encoding technique based on the image feature information if there is the image feature information, and determining the encoding technique by analyzing an image corresponding to the changed region if there is no image feature information.

In the method, the encoding technique may correspond to one of PNG (portable network graphics), paletted PNG (portable network graphics) and JPEG (joint photography experts group).

In the method, the encoding step may include identifying the changed region as one of a normal region and a picture region by analyzing the image corresponding to the changed region, and determining the encoding technique by considering at least one of an image processing result of the normal region and an image type of the picture region.

In the method, the image type may correspond to one of a natural image and a synthetic image.

In the method, the capturing step may include capturing, as the changed region, a specific region changed in a screen area corresponding to the changed frame in comparison with a screen area corresponding to the previous frame.

In the method, the capturing step may include detecting a section having a smaller frame change in all frames to be transmitted to a terminal device of the user, and to capture the changed region in the detected section.

In the method, the capturing step may include detecting the section having a smaller frame change by sensing an event type of an application occurring at the terminal device of the user.

Additionally, a cloud streaming service system according to an embodiment of the present invention comprises a cloud streaming server configured to capture a changed region contained in a changed frame, to determine an encoding technique by considering whether there is image feature information corresponding to the changed region, to perform a still image encoding of the changed region by using the encoding technique, and to perform a cloud streaming service based on a still image by sending the still-image-encoded changed region to a user; and a terminal configured to receive, from the cloud streaming server, an application execution result screen corresponding to the cloud streaming service.

Additionally, a cloud streaming server according to yet another embodiment of the present invention comprises a capture unit configured to capture a changed region contained in a changed frame in comparison with a previous frame; an encoding unit configured to select an encoding processing unit by considering one or more of an image feature and an image resolution corresponding to the changed region, and to perform a still image encoding of the changed region corresponding to one frame by using the encoding processing unit; and a sending unit configured to perform a cloud streaming service based on a still image by sending the still-image-encoded changed region to a user.

In the cloud streaming server, the encoding processing unit may correspond to one of a central processing unit (CPU) and a graphics processing unit (GPU).

In the cloud streaming server, the encoding unit may be further configured to predict an encoding processing cost for each of the CPU and the GPU by considering one or more of the image feature and the image resolution, and to perform the still image encoding of the changed region by selecting the encoding processing unit having a lower predicted encoding processing cost from among the CPU and the GPU.

In the cloud streaming server, the encoding unit may be further configured to perform the still image encoding of the changed region by using the GPU when the image resolution corresponding to the changed region is equal to or greater than a predetermined reference value.

In the cloud streaming server, the encoding unit may be further configured to select the encoding processing unit by considering a still image compression technique depending on the image feature when the image resolution corresponding to the changed region is smaller than the predetermined reference value.

In the cloud streaming server, the still image compression technique may correspond to one of PNG (portable network graphics), paletted PNG (portable network graphics) and PEG (joint photography experts group).

In the cloud streaming server, the encoding unit may be further configured to perform the still image encoding of the changed region by using the GPU when the image resolution is smaller than the predetermined reference value and when the still image compression technique is the paletted PNG.

In the cloud streaming server, the capture unit may be further configured to capture, as the changed region, a specific region changed in a screen area corresponding to the changed frame in comparison with a screen area corresponding to the previous frame.

In the cloud streaming server, the capture unit may be further configured to detect a section having a smaller frame change in all frames to be transmitted to a terminal device of the user, and to capture the changed region in the detected section.

In the cloud streaming server, the capture unit may be further configured to detect the section having a smaller frame change by sensing an event type of an application occurring at the terminal device of the user.

Additionally, a cloud streaming service method using a selective encoding processing unit according to the present invention comprises steps of capturing a changed region contained in a changed frame in comparison with a previous frame; selecting an encoding processing unit by considering one or more of an image feature and an image resolution corresponding to the changed region, and performing a still image encoding of the changed region corresponding to one frame by using the encoding processing unit; and performing a cloud streaming service based on a still image by sending the still-image-encoded changed region to a user.

In the method, the encoding processing unit may correspond to one of a central processing unit (CPU) and a graphics processing unit (GPU).

In the method, the encoding step may include predicting an encoding processing cost for each of the CPU and the GPU by considering one or more of the image feature and the image resolution, and performing the still image encoding of the changed region by selecting the encoding processing unit having a lower predicted encoding processing cost from among the CPU and the GPU.

In the method, the encoding step may include performing the still image encoding of the changed region by using the GPU when the image resolution corresponding to the changed region is equal to or greater than a predetermined reference value.

In the method, the encoding step may include selecting the encoding processing unit by considering a still image compression technique depending on the image feature when the image resolution corresponding to the changed region is smaller than the predetermined reference value.

In the method, the still image compression technique may correspond to one of PNG (portable network graphics), paletted PNG (portable network graphics) and JPEG (joint photography experts group).

In the method, the encoding step may include performing the still image encoding of the changed region by using the GPU when the image resolution is smaller than the predetermined reference value and when the still image compression technique is the paletted PNG In the method, the capture step may include capturing, as the changed region, a specific region changed in a screen area corresponding to the changed frame in comparison with a screen area corresponding to the previous frame.

In the method, the capture step may include detecting a section having a smaller frame change in all frames to be transmitted to a terminal device of the user, and capturing the changed region in the detected section.

In the method, the capture step may include detecting the section having a smaller frame change by sensing an event type of an application occurring at the terminal device of the user.

Additionally, a cloud streaming service system according to another embodiment of the present invention comprises a cloud streaming server configured to capture a changed region contained in a changed frame in comparison with a previous frame, to select an encoding processing unit by considering one or more of an image feature and an image resolution corresponding to the changed region, to perform a still image encoding of the changed region corresponding to one frame by using the encoding processing unit, and to perform a cloud streaming service based on a still image by sending the still-image-encoded changed region to a user; and a terminal configured to receive, from the cloud streaming server, an application execution result screen corresponding to the cloud streaming service.

Additionally, a cloud streaming server according to yet another embodiment of the present invention comprises a capture unit configured to capture a changed region contained in a changed frame; an encoding unit configured to divide an encoding process for the changed region into a plurality of unit processes, to allocate at least one of the unit processes to a graphics processing unit (GPU), to allocate remaining unit processes to a central processing unit (CPU), and to perform the encoding process for a still image encoding of the changed region; and a sending unit configured to perform a cloud streaming service based on a still image by sending the still-image-encoded changed region to a user.

In the cloud streaming server, each of the unit processes may correspond to one of an image analysis, a still image compression technique determination, a still image compression, and a compression data collection.

In the cloud streaming server, the encoding unit may be further configured to allocate the unit process corresponding to the still image compression to the GPU, based on a processing result corresponding to the image analysis and the still image compression technique determination.

In the cloud streaming server, the still image compression may include, for an image corresponding to the changed region, at least one of a color histogram construction, a palette creation, a palette-based original color quantization, and a palette-based encoding.

In the cloud streaming server, the GPU may deliver a processing result corresponding to the still image compression to the CPU.

In the cloud streaming server, the CPU may perform the unit process corresponding to the compression data collection by using a processing result corresponding to the still image compression.

In the cloud streaming server, the CPU may deliver image data corresponding to the changed region to the GPU when the unit process corresponding to the still image compression is allocated to the GPU.

In the cloud streaming server, the capture unit may be further configured to capture, as the changed region, a specific region changed in a screen area corresponding to the changed frame in comparison with a screen area corresponding to the previous frame.

In the cloud streaming server, the capture unit may be further configured to detect a section having a smaller frame change in all frames to be transmitted to a terminal device of the user, and to capture the changed region in the detected section.

In the cloud streaming server, the capture unit may be further configured to detect the section having a smaller frame change by sensing an event type of an application occurring at the terminal device of the user.

Additionally, a cloud streaming service method through a task separation of an encoding processing unit according to the present invention comprises steps of capturing a changed region contained in a changed frame; dividing an encoding process for the changed region into a plurality of unit processes, allocating at least one of the unit processes to a graphics processing unit (GPU), allocating remaining unit processes to a central processing unit (CPU), and performing the encoding process for a still image encoding of the changed region; and performing a cloud streaming service based on a still image by sending the still-image-encoded changed region to a user.

In the method, each of the unit processes may correspond to one of an image analysis, a still image compression technique determination, a still image compression, and a compression data collection.

In the method, the encoding step may include allocating the unit process corresponding to the still image compression to the GPU, based on a processing result corresponding to the image analysis and the still image compression technique determination.

In the method, the still image compression may include, for an image corresponding to the changed region, at least one of a color histogram construction, a palette creation, a palette-based original color quantization, and a palette-based encoding.

In the method, the GPU may deliver a processing result corresponding to the still image compression to the CPU.

In the method, the CPU may perform the unit process corresponding to the compression data collection by using a processing result corresponding to the still image compression.

In the method, the CPU may deliver image data corresponding to the changed region to the GPU when the unit process corresponding to the still image compression is allocated to the GPU.

In the method, the capturing step may include capturing, as the changed region, a specific region changed in a screen area corresponding to the changed frame in comparison with a screen area corresponding to the previous frame.

In the method, the capturing step may include detecting a section having a smaller frame change in all frames to be transmitted to a terminal device of the user, and capturing the changed region in the detected section.

In the method, the capturing step may include detecting the section having a smaller frame change by sensing an event type of an application occurring at the terminal device of the user.

Additionally, a cloud streaming service system according to yet embodiment of the present invention comprises a cloud streaming server configured to capture a changed region contained in a changed frame, to divide an encoding process for the changed region into a plurality of unit processes, to allocate at least one of the unit processes to a graphics processing unit (GPU), to allocate remaining unit processes to a central processing unit (CPU), to perform the encoding process for a still image encoding of the changed region, and to perform a cloud streaming service based on a still image by sending the still-image-encoded changed region to a user; and a terminal configured to receive, from the cloud streaming server, an application execution result screen corresponding to the cloud streaming service.

Further, in order to solve the above objects, the present invention provides a computer program, recorded on a medium, for executing the above-discussed method.

Advantageous Effects

According to the present invention, it is possible to improve compression efficiency and a service speed in a cloud streaming service by using a suitable still image compression technique for context when a cloud streaming service based on a still image is provided.

Additionally, the present invention may improve compression efficiency and a service speed in a cloud streaming service by using a suitable still image compression technique for an image type when a cloud streaming service based on a still image is provided.

Additionally, the present invention may provide a faster cloud streaming service to more users over the same band by maximizing the efficiency of streaming compression through a cloud streaming service based on a still image.

Additionally, the present invention may provide a faster cloud streaming service to more users over the same band by applying a still image compression technique to a changed region between a current frame and a previous frame when a cloud streaming service using a still image compression technique is provided.

Additionally, the present invention may rapidly detect a target for still image compression by determining a changed region through a scanning of a differential frame between a current frame and a previous frame when a cloud streaming service using a still image compression technique is provided.

Additionally, the present invention may construct an efficient cloud streaming server capable of saving server resources, typically required for image processing, by determining an encoding technique based on image feature information created using an application source code and an MPEG texture descriptor.

Additionally, the present invention may provide a cloud streaming service to a user more quickly by reducing a service time, required for image processing, through a still image encoding based on image feature information.

Additionally, the present invention may reduce the processing cost of a cloud streaming service by improving the efficiency of the cloud streaming service.

Additionally, the present invention may reduce the use of resources at a cloud streaming server by separately performing an encoding process through different encoding processing units when a cloud streaming service is provided.

Additionally, the present invention may reduce a delay situation, which may be caused due to a server load, by using a graphics processing unit together with a central processing unit when a cloud streaming service is provided.

DESCRIPTION OF DRAWINGS

FIG. 26 is a flow diagram illustrating in detail a cloud streaming service method through a task separation of an encoding processing unit according to an embodiment of the present invention.

MODE FOR INVENTION

Figure 1:
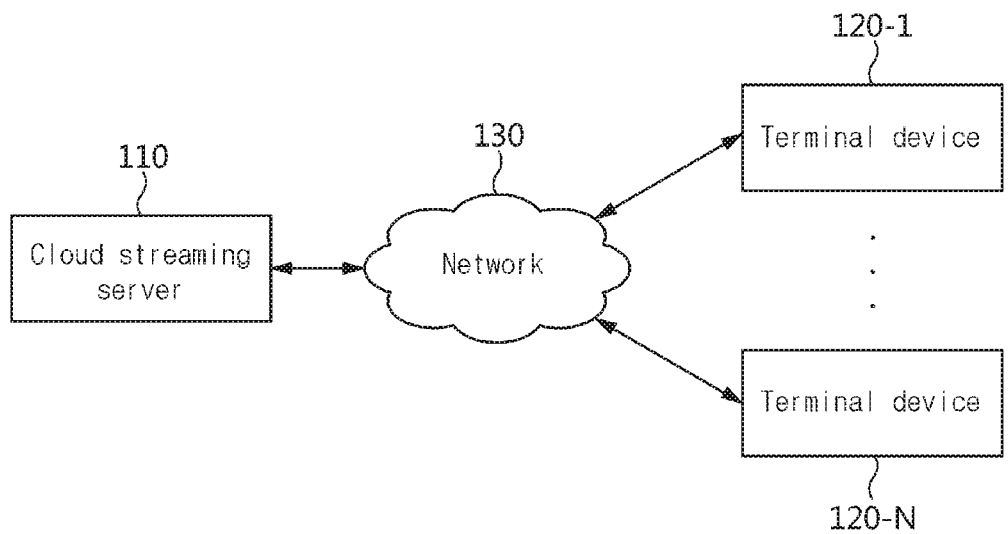
FIG. 1 is a block diagram illustrating a cloud streaming service system using a still image compression technique according to an embodiment of the present invention.

Hereinafter, various embodiments of the present invention will be described in detail with reference to the accompanying drawings. However, well known functions and elements may not be described in detail to avoid obscuring the subject matter of this invention. Through the drawings, the same or similar reference numerals denote corresponding features consistently.

The terms and words used in the present specification and claims should not be construed to be limited to ordinary or dictionary meanings. In addition, the terms and words used in various embodiments of this invention are used to merely describe specific embodiments and are not intended to limit such embodiments. Therefore, while the following description is particularly shown and described with reference to exemplary embodiments thereof, the following description of exemplary embodiments is provided for illustration purpose only and not for the purpose of limiting the invention as defined by the appended claims and their equivalents. Additionally, the terms including expressions "first", "second", etc. are used for merely distinguishing one element from other elements but do not limit the corresponding elements.

Hereinafter, a terminal according to embodiments of the present invention will be described as a mobile communication device which is connected to a communication network and is capable of uploading or downloading content, based on a cloud computing system. This is, however, exemplary only and not to be construed as a limitation of the present invention. Alternatively, various devices such as information communication devices, multimedia terminals, wired terminals, fixed terminals, and internet protocol (IP) terminals may be used. Also, the terminal may be a mobile device having various mobile communication specifications, such as a mobile phone, a portable multimedia player (PMP), a mobile Internet device (MID), a smart phone, a desktop, a tablet PC, a notebook, a net book, and an information communication device.

Hereinafter, a data management system based on cloud computing according to an embodiment of the present invention will be described. Hereinafter, a content sharing may be a concept including content transmission, and a data management may be a concept including data transmission.

FIG. 1 is a block diagram illustrating a cloud streaming service system using a still image compression technique according to an embodiment of the present invention.

Referring to FIG. 1, the cloud streaming service system using a still image compression technique according to an embodiment of this invention includes a cloud streaming server 110, terminal devices 120-1 to 120-N, and a network 130.

The cloud streaming server 110 executes an application in response to a request for a cloud streaming service from the terminal devices 120-1 to 120-N and provides an execution resultant screen corresponding to a result of executing the application to the terminal devices 120-1 to 120-N.

The cloud streaming service basically applies a cloud streaming technique based on a video codec. Therefore, even when the cloud streaming technique is applied to a static screen such as a menu display, the cloud streaming service has been performed in an ineffective manner of unnecessarily capturing the entire screen and encoding with the video codec. In order to solve this problem, the present invention provides the cloud streaming service system in which the cloud streaming server detects a changed region between frames in case of a smaller change between frames, such as a menu display screen, and encodes the changed region only through the still image compression technique.

The cloud streaming server 110 determines a changed region of a current frame changed from a previous frame by comparing the current frame with the previous frame, and then captures the changed region. In this case, the server may detect a section having a smaller frame change in all frames to be transmitted to the terminal devices 120-1 to 120-N and then capture the changed region in the detected section. At this time, by identifying an event type of an application occurring at the terminal devices 120-1 to 120-N, such a section having a smaller frame change may be detected.

Additionally, the cloud streaming server 110 selects a still image compression technique in accordance with an image type determined by considering one or more of the number of colors of an image corresponding to the changed region and a standard deviation of pixel values of the image, and performs a still image encoding of the changed region corresponding to one frame by using the selected still image compression technique. In this case, the server may select the still image compression technique depending on one of image types such as a natural image and a synthetic image. If the number of colors of the image corresponding to the changed region is greater than a predetermined reference number, the server may determine the image type as a natural image. If the number of colors of the image corresponding to the changed region is equal to or smaller than the predetermined reference number, the server may determine the image type by considering the standard deviation of the pixel values of the image corresponding to the changed region. If the number of colors of the image corresponding to the changed region is equal to or smaller than the predetermined reference number, and if the standard deviation of the pixel values of the image corresponding to the changed region is equal to or smaller than a predetermined reference value, the server may determine the image type as a synthetic image. If the standard deviation of the pixel values of the image corresponding to the changed region is greater than the predetermined reference value, the server may determine the image type as a natural image. In this case, the server may perform a still image encoding of the changed region by using a still image compression technique selected from PNG (portable network graphics) and JPEG (joint photography experts group) in accordance with the image type.

Also, the cloud streaming server 110 transmits the still-image-encoded changed region to a user, thus performing the cloud streaming service based on a still image.

The terminal devices 120-1 to 120-N receive an application execution result screen corresponding to the cloud streaming service from the cloud streaming server 110 and then provide it to a user.

The terminal devices 120-1 to 120-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 120-1 to 120-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 130 offers a route of delivering data between the cloud streaming server 110 and the terminal devices 120-1 to 120-N, including a typically used network and any future developable network. For example, the network 130 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 130 is not limited to the existing transmission scheme standard, and may include all transmission scheme standards to be developed in the future. Also, the network used between the cloud streaming server 110 and the terminal devices 120-1 to 120-N in FIG. 1 may be different from or identical with a network between the terminal devices 120-1 to 120-N.

Figure 2:
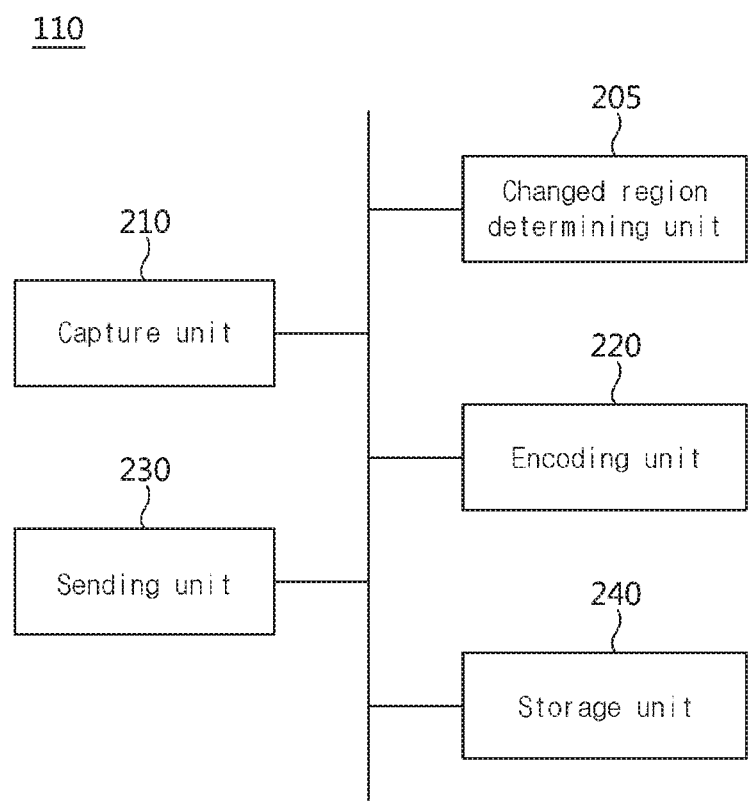
FIG. 2 is a block diagram illustrating an example of the cloud streaming server shown in FIG. 1.

FIG. 2 is a block diagram illustrating an example of the cloud streaming server shown in FIG. 1.

Referring to FIG. 2, the cloud streaming server 110 shown in FIG. 1 includes a changed region determining unit 205, a capture unit 210, an encoding unit 220, a sending unit 230, and a storage unit 240.

The cloud streaming service basically applies cloud streaming technique based on a video codec. Therefore, even when the cloud streaming technique is applied to a static screen such as a menu display, the cloud streaming service has been performed in an ineffective manner of unnecessarily capturing the entire screen and encoding with the video codec. In order to solve this problem, the present invention provides the cloud streaming server 110 for detecting a changed region between frames in case of a smaller change between frames, such as a menu display screen, and encoding the changed region only through the still image compression technique.

The changed region determining unit 205 compares a current frame with a previous frame and determines a changed region of the current frame changed from the previous frame.

The cloud streaming technique based on the video codec may capture and encode all frames corresponding to a screen on which an application is running. However, if there is a smaller change between frames on the screen, a still image encoding may be performed by capturing only the changed region of a changed frame in comparison with the previous frame. Therefore, the user's terminal device can fixedly display an unchanged region and dynamically display the changed region only.

In this case, a certain region of a screen area corresponding to the changed frame that is different from a screen area corresponding to the previous frame may be captured as the changed region. For example, if a region of the changed frame changed from a corresponding region of the previous frame is a region A, the region A only in the screen area of the changed frame may be captured as the changed region. Depending on input signals entered at the user's terminal device, the changed region may have various sizes, and an image corresponding to the changed region may have various types.

In this case, the changed region determining unit may calculate a differential frame between the previous frame and the current frame, and determine the changed region by using the differential frame. At this time, the changed region determining unit may determine the changed region by detecting a changed pixel of the current frame changed from the previous frame through a scanning of the differential frame. Also, the changed region determining unit may determine the changed region containing changed pixels detected through a horizontal scanning and a vertical scanning of the differential frame. For example, when a changed pixel is detected through the horizontal scanning of the differential frame on a row-by-row basis from top to bottom, an y0 element corresponding to the relevant row may be obtained. Also, when a changed pixel is detected through the horizontal scanning of the differential frame on a row-by-row basis from bottom to top, an y1 element corresponding to the relevant row may be obtained. Also, when a changed pixel is detected through the vertical scanning of the differential frame on a column-by-column basis from left to right, an x0 corresponding to the relevant column may be obtained. And also, when a changed pixel is detected through the vertical scanning of the differential frame on a column-by-column basis from right to left, an x1 element corresponding to the relevant column may be obtained. Then the changed region determining unit may determine, as the changed region, a rectangular region that has, as vertices, four pixels (x0, y0), (x1, y0), (x1, y1) and (x0, y1).

The capture unit 210 captures the changed region. At this time, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

The encoding unit 220 selects a still image compression technique in accordance with an image type determined by considering one or more of the number of colors of an image corresponding to the changed region and a standard deviation of pixel values of the image, and performs a still image encoding of the changed region corresponding to one frame by using the selected still image compression technique. For example, because the image type of the captured changed region may be a single image, such as one photo or one picture, or a mixed image of several images, the encoding unit may determine the image type, select the still image compression technique suitable for each image type, and perform a still image encoding so as to increase the compression efficiency of the changed region.

In this case, the encoding unit may select the still image compression technique depending on one of image types such as a natural image and a synthetic image. The natural image may refer to an image of an object that occurs naturally. For example, the natural image may refer to an optical image, such as one photo or one picture, or an image having other wavelength such as an x-ray and an infrared ray. Contrary to the natural image, the synthetic image may refer to an image created or mixed through a computer or any other artificial means.

If the number of colors of the image corresponding to the changed region is greater than a predetermined reference number, the encoding unit may determine the image type as a natural image. Because the natural image may be an image of an object that occurs naturally, changes in brightness and saturation applied to colors that represent an image may be elaborate in comparison with a synthetic image. Therefore, because the number of colors expressed by pixels constituting a natural image may be varied in comparison with a synthetic image, the image type corresponding to the changed region may be determined by considering the number of colors of an image corresponding to the changed region. For example, if a predetermined reference number is 100,000, the image type may be determined as a natural image when the number of colors that constitute an image corresponding to the changed region is greater than 100,000, and the image type may be determined as a synthetic image when the number of colors is equal to or smaller than 100,000.

If the number of colors of the image corresponding to the changed region is equal to or smaller than the predetermined reference number, the encoding unit may determine the image type by considering the standard deviation of the pixel values of the image corresponding to the changed region. The standard deviation of the pixel values may refer to variations in a distribution of color values expressed by pixels of the image corresponding to the changed region. If the variation denotes zero, this may mean that all colors have the same value. Namely, a smaller standard deviation of pixel values may mean that the image is formed of a smaller number of colors. Therefore, by considering the standard deviation of the pixel values of the image, the image type of the image corresponding to the changed region may be determined.

If the number of colors of the image corresponding to the changed region is equal to or smaller than the predetermined reference number, and if the standard deviation of the pixel values of the image corresponding to the changed region is equal to or smaller than a predetermined reference value, the encoding unit may determine the image type as a synthetic image. For example, let's suppose that the predetermined reference number regarding the number of image colors is 100,000 and also the predetermined reference value regarding the standard deviation of image pixel values is N. In this case, if the number of colors of the image corresponding to the changed region is equal to or smaller than 100,000 and if the standard deviation of color values of the image corresponding to the changed region is equal to or smaller than N, the image type may be determined as a synthetic image.

If the standard deviation of the pixel values of the image corresponding to the changed region is greater than the predetermined reference value, the encoding unit may determine the image type as a natural image. For example, if the standard deviation of the pixel values of an image is greater than the predetermined reference value, this may mean that the image is formed of a greater number of colors. Therefore, if the standard deviation of the pixel values of the image is greater than the predetermined reference value, the encoding unit may determine that the image corresponding to the changed region is a natural image formed of many colors.

In this case, the encoding unit may perform a still image encoding of the changed region by using a still image compression technique selected from PNG (portable network graphics) and JPEG (joint photography experts group) in accordance with the image type.

The PNG still image compression technique may obtain a good quality of an image but may cause an increase in size of data when encoding. Therefore, if the bandwidth of a transmission network is low, a transmission speed may be lowered. The JPEG still image compression technique has a good compression efficiency and thus can considerably reduce the amount of transmission data when encoding but may cause a great system load because of a high compression efficiency when encoding and decoding. Also, the JPEG still image compression technique may be more effective in compressing a natural image in which similar colors gather around one pixel. Therefore, if the image type corresponding to the changed region is a natural image, the encoding unit may encode the changed region through the JPEG still image compression technique.

Additionally, if the changed region is a synthetic image, the JPEG still image compression technique may not reach the expectation of the compression efficiency as much as a natural image. Therefore, in case of a synthetic image, the encoding unit may perform a still image encoding of the changed region by selecting the PNG still image compression technique capable of enhancing the image quality.

Additionally, if the changed region is a synthetic image and has a greater size resulting in great data, the encoding unit may encode the changed region by using the paletted PNG still image compression technique capable of reducing the size of data. The paletted PNG still image compression technique may guarantee a transmission speed because of a reduced data size of an image when encoding but may cause the degradation of an image quality since the color is expressed with 8 bits.

The sending unit 230 performs a cloud streaming service based on a still image by sending the still-image-encoded changed region to a user. Namely, by transmitting the changed region, compressed through encoding, to a user's terminal device, the user can experience as if an application is being executed at the user's terminal device.

The storage unit 240 stores various kinds of the above-discussed information created in a cloud streaming service process according to an embodiment of this invention.

According to an embodiment, the storage unit 240 may be formed independently from the cloud streaming server 110 and support a function for the cloud streaming service. In this case, the storage unit 240 may operate as separate high-capacity storage and include a control function for the operation.

In addition, the above-discussed cloud streaming server 110 may be also implemented by means of one or more servers.

Meanwhile, the cloud streaming server 110 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 3:
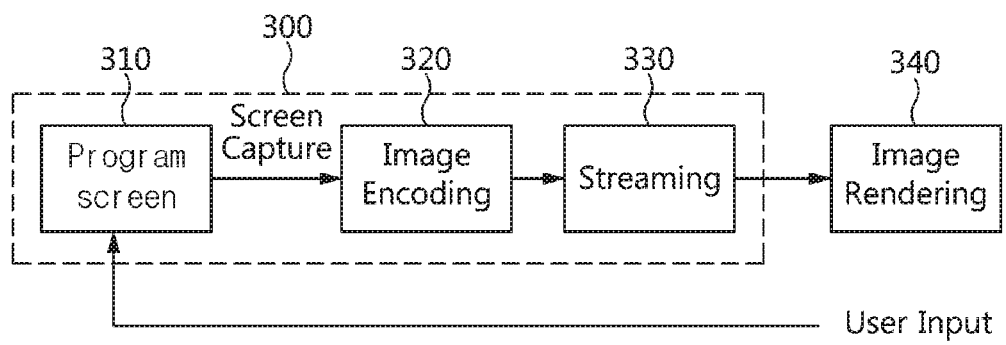
FIG. 3 is a diagram illustrating an example of a cloud streaming system.

FIG. 3 is a diagram illustrating an example of a cloud streaming system.

Referring to FIG. 3, a server 300 may execute a program screen 310 in response to a user input received from the user's terminal device and perform a screen capture. In this case, the server 300 may be a cloud streaming server or a web application server. A process of executing the program screen 310 and performing a screen capture may correspond to an operation flow of the capture unit 210 shown in FIG. 2.

The server 300 may perform an image encoding 320 of the captured program screen 310 through a still image compression technique. In this case, a process of performing the image encoding 320 may correspond to an operation flow of the encoding unit 220 shown in FIG. 2.

At this time, the server may compare a current frame with a previous frame and then capture a changed region only of the current frame which is changed from the previous frame. Also, the server may select one of still image compression techniques such as PNG (portable network graphics) and PEG (joint photography experts group) by considering an image type of the changed region, and then encode the changed region through the selected still image compression technique.

Thereafter, the server 300 may perform streaming 330 of the still-image-encoded changed region to the user's terminal device, thus providing a cloud streaming service based on a still image. In this case, a process of performing the streaming 330 may correspond to an operation flow of the sending unit 230 shown in FIG. 2.

Thereafter, the user's terminal device performs rendering 340 of received data and thereby display the program screen 310 to the user as if the program screen executed in an application in response to a user input is executed at the user's terminal device.

Figure 4:
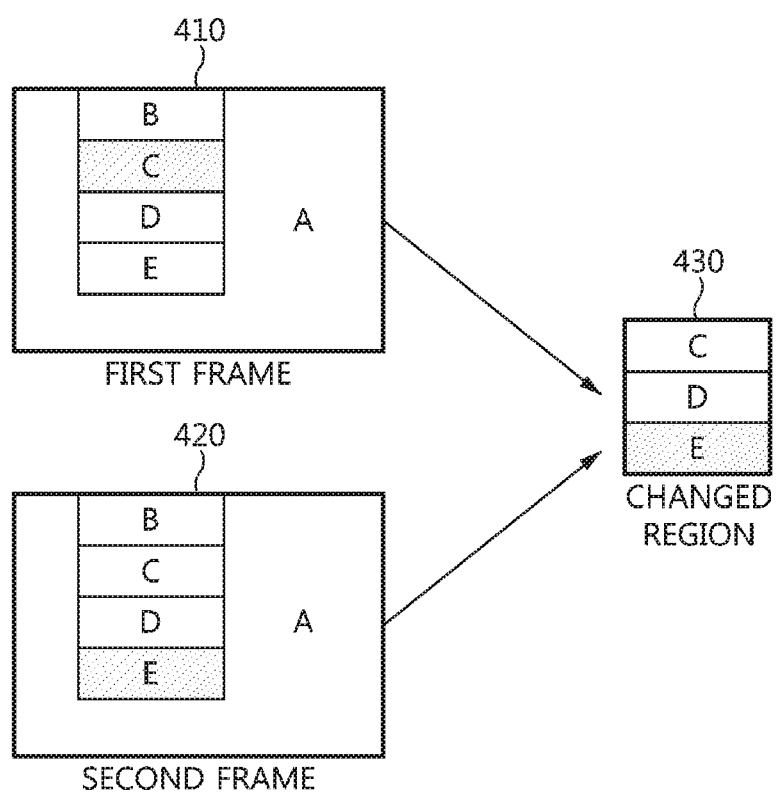
FIG. 4 is a diagram illustrating a process of capturing a changed region in a cloud streaming service using a still image compression technique according to an embodiment of the present invention.

FIG. 4 is a diagram illustrating a process of capturing a changed region in a cloud streaming service using a still image compression technique according to an embodiment of the present invention.

Referring to FIG. 4, the cloud streaming service using a still image compression technique according to an embodiment of this invention may compare the first frame 410 with the second frame 420 and then capture and encode a changed region 430 only.

For example, let's suppose that regions B, C, D and E in the first and second frames 410 and 420 are menu displays. In the first frame 410, a cursor is located at the region C, so that the region C may be highlighted to be distinguished from the other regions B, D and E. In the second frame 420, the cursor is moved from the region C to the region E, so that the region E may be highlighted to be distinguished from the other regions B, C and In this case, as the result of comparison between the first and second frames 410 and 420, a rectangular region (C, D and E) containing the regions C and E may be captured as the changed region 430. The server may also select a still image compression technique by considering the size of the changed region 430 and the image type of the changed region 430, and then encode the changed region 430 by using the selected still image compression technique.

A typical cloud streaming service may perform encoding by capturing all frames, corresponding to a frame rate, including the first and second frames 410 and 420 which are certainly changed. However, the cloud streaming service based on a still image captures only the changed region 430 and encodes it through the still image compression technique, thus improving the efficiency of a service in comparison with the typical cloud streaming service that unnecessarily captures many frames and the entire screen of such a frame.

Figure 5:
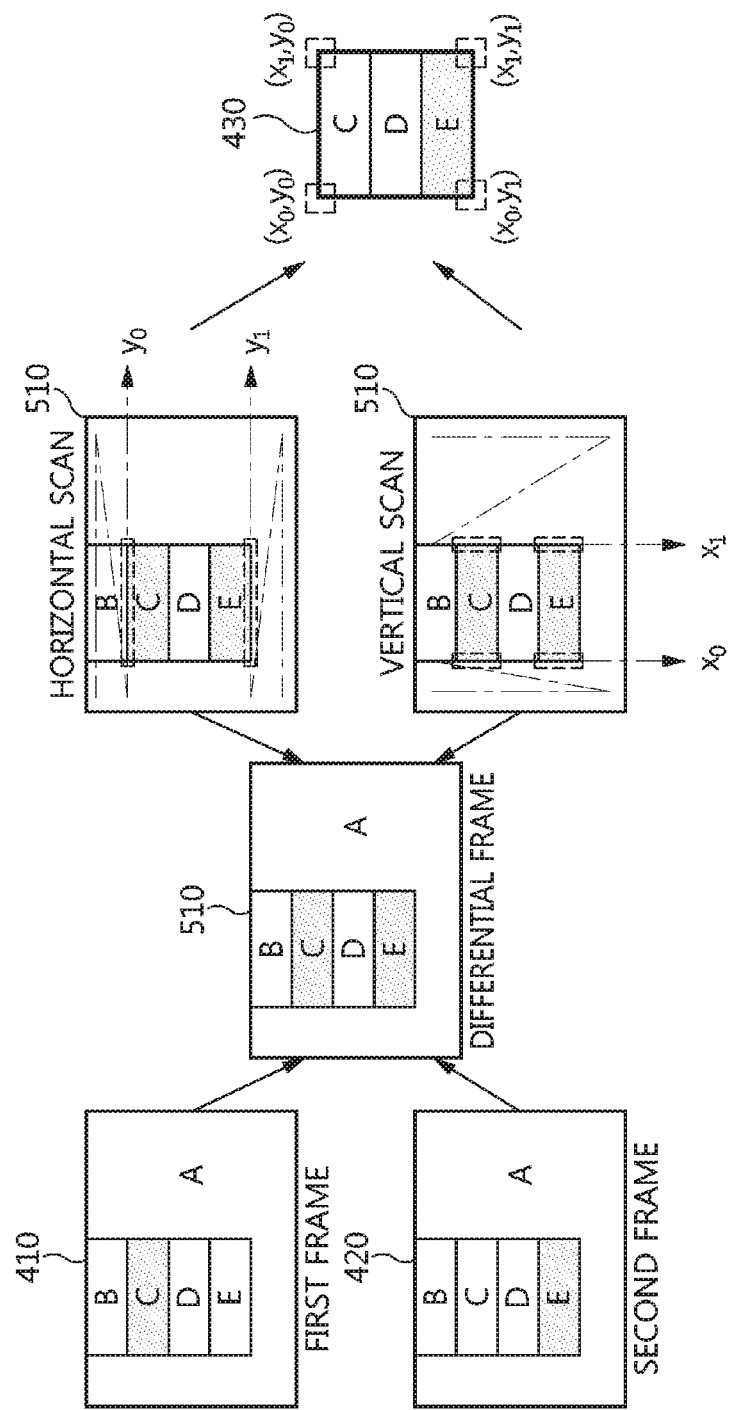
FIG. 5 is a diagram illustrating a process of determining a changed region in a cloud streaming service using a still image compression technique according to an embodiment of the present invention.

FIG. 5 is a diagram illustrating a process of determining a changed region in a cloud streaming service using a still image compression technique according to an embodiment of the present invention.

Referring to FIG. 5, the cloud streaming service using a still image compression technique according to an embodiment of this invention determines, as a changed region 430, a rectangular region, which contains changed pixels and has the minimum area, by using a differential frame 510 between the first frame 410 and the second frame 420.

For example, when a changed pixel is detected through the horizontal scanning of the differential frame 510 on a row-by-row basis from top to bottom, an y0 element corresponding to the relevant row may be obtained. Also, when a changed pixel is detected through the horizontal scanning of the differential frame 510 on a row-by-row basis from bottom to top, an y1 element corresponding to the relevant row may be obtained. Also, when a changed pixel is detected through the vertical scanning of the differential frame 510 on a column-by-column basis from left to right, an x0 corresponding to the relevant column may be obtained. And also, when a changed pixel is detected through the vertical scanning of the differential frame 510 on a column-by-column basis from right to left, an x1 element corresponding to the relevant column may be obtained. Then a rectangular region that has, as vertices, four pixels x0, y0), (x1, y0), (x1, y1) and (x0, y1) may be determined as the changed region 430.

Figure 6:
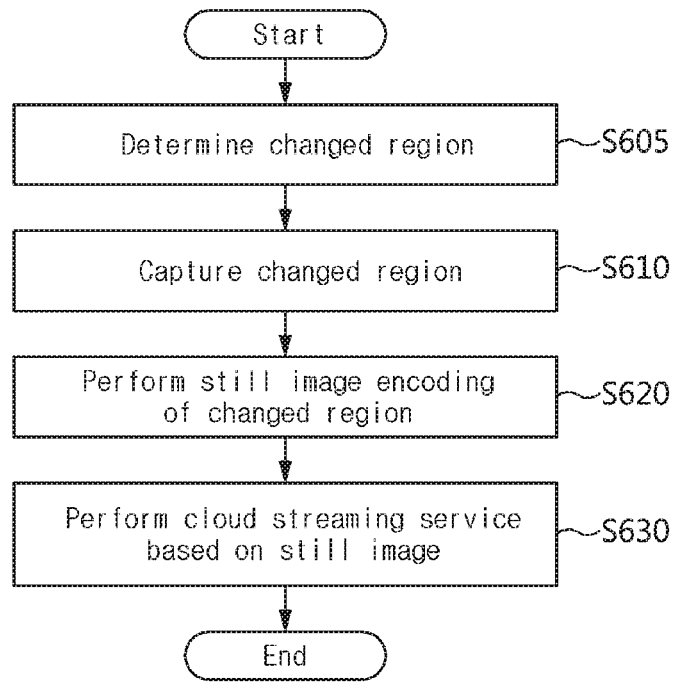
FIG. 6 is a flow diagram illustrating a cloud streaming service method using a still image compression technique according to an embodiment of the present invention.

FIG. 6 is a flow diagram illustrating a cloud streaming service method using a still image compression technique according to an embodiment of the present invention.

Referring to FIG. 6, the cloud streaming service method using a still image compression technique according to an embodiment of this invention compares a current frame with a previous frame and determines a changed region of the current frame changed from the previous frame (S605).

A cloud streaming technique based on a video codec may performing encoding by capturing all frames corresponding to a screen on which an application is running. However, when a change between frames is small on the screen where the application is running, it is possible to perform a still image encoding by capturing only a changed region of a changed frame in comparison with a previous frame such that a user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, the server may calculate a differential frame between the previous frame and the current frame, and determine the changed region by using the differential frame. At this time, the server may determine the changed region by detecting a changed pixel of the current frame changed from the previous frame through a scanning of the differential frame. Also, the server may determine the changed region containing changed pixels detected through a horizontal scanning and a vertical scanning of the differential frame. For example, when a changed pixel is detected through the horizontal scanning of the differential frame on a row-by-row basis from top to bottom, an y0 element corresponding to the relevant row may be obtained. Also, when a changed pixel is detected through the horizontal scanning of the differential frame on a row-by-row basis from bottom to top, an y1 element corresponding to the relevant row may be obtained. Also, when a changed pixel is detected through the vertical scanning of the differential frame on a column-by-column basis from left to right, an x0 corresponding to the relevant column may be obtained. And also, when a changed pixel is detected through the vertical scanning of the differential frame on a column-by-column basis from right to left, an x1 element corresponding to the relevant column may be obtained. Then the server may determine, as the changed region, a rectangular region that has, as vertices, four pixels (x0, y0), (x1, y0), (x1, y1) and (x0, y1).

Additionally, the cloud streaming service method using a still image compression technique according to an embodiment of this invention captures the changed region (S610).

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined, Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

Additionally, the cloud streaming service method using a still image compression technique according to an embodiment of this invention selects a still image compression technique in accordance with an image type determined by considering one or more of the number of colors of an image corresponding to the changed region and a standard deviation of pixel values of the image, and performs a still image encoding of the changed region corresponding to one frame by using the selected still image compression technique (S620). For example, because the image type of the captured changed region may be a single image, such as one photo or one picture, or a mixed image of several images, the server may determine the image type, select the still image compression technique suitable for each image type, and perform a still image encoding so as to increase the compression efficiency of the changed region.

In this case, the server may select the still image compression technique depending on one of image types such as a natural image and a synthetic image. The natural image may refer to an image of an object that occurs naturally. For example, the natural image may refer to an optical image, such as one photo or one picture, or an image having other wavelength such as an x-ray and an infrared ray. Contrary to the natural image, the synthetic image may refer to an image created or mixed through a computer or any other artificial means.

If the number of colors of the image corresponding to the changed region is greater than a predetermined reference number, the server may determine the image type as a natural image. Because the natural image may be an image of an object that occurs naturally, changes in brightness and saturation applied to colors that represent an image may be elaborate in comparison with a synthetic image. Therefore, because the number of colors expressed by pixels constituting a natural image may be varied in comparison with a synthetic image, the image type corresponding to the changed region may be determined by considering the number of colors of an image corresponding to the changed region. For example, if a predetermined reference number is 100,000, the image type may be determined as a natural image when the number of colors that constitute an image corresponding to the changed region is greater than 100,000, and the image type may be determined as a synthetic image when the number of colors is equal to or smaller than 100,000.

If the number of colors of the image corresponding to the changed region is equal to or smaller than the predetermined reference number, the server may determine the image type by considering the standard deviation of the pixel values of the image corresponding to the changed region. The standard deviation of the pixel values may refer to variations in a distribution of color values expressed by pixels of the image corresponding to the changed region. If the variation denotes zero, this may mean that all colors have the same value. Namely, a smaller standard deviation of pixel values may mean that the image is formed of a smaller number of colors. Therefore, by considering the standard deviation of the pixel values of the image, the image type of the image corresponding to the changed region may be determined.

If the number of colors of the image corresponding to the changed region is equal to or smaller than the predetermined reference number, and if the standard deviation of the pixel values of the image corresponding to the changed region is equal to or smaller than a predetermined reference value, the server may determine the image type as a synthetic image. For example, let's suppose that the predetermined reference number regarding the number of image colors is 100,000 and also the predetermined reference value regarding the standard deviation of image pixel values is N. In this case, if the number of colors of the image corresponding to the changed region is equal to or smaller than 100,000 and if the standard deviation of color values of the image corresponding to the changed region is equal to or smaller than N, the image type may be determined as a synthetic image.

If the standard deviation of the pixel values of the image corresponding to the changed region is greater than the predetermined reference value, the server may determine the image type as a natural image. For example, if the standard deviation of the pixel values of an image is greater than the predetermined reference value, this may mean that the image is formed of a greater number of colors. Therefore, if the standard deviation of the pixel values of the image is greater than the predetermined reference value, the server may determine that the image corresponding to the changed region is a natural image formed of many colors.

In this case, the server may perform a still image encoding of the changed region by using a still image compression technique selected from PNG (portable network graphics) and JPEG (joint photography experts group) in accordance with the image type.

The PNG still image compression technique may obtain a good quality of an image but may cause an increase in size of data when encoding. Therefore, if the bandwidth of a transmission network is low, a transmission speed may be lowered. The JPEG still image compression technique has a good compression efficiency and thus can considerably reduce the amount of transmission data when encoding but may cause a great system load because of a high compression efficiency when encoding and decoding. Also, the PEG still image compression technique may be more effective in compressing a natural image in which similar colors gather around one pixel. Therefore, if the image type corresponding to the changed region is a natural image, the server may encode the changed region through the JPEG still image compression technique.

Additionally, if the changed region is a synthetic image, the JPEG still image compression technique may not reach the expectation of the compression efficiency as much as a natural image. Therefore, in case of a synthetic image, the server may perform a still image encoding of the changed region by selecting the PNG still image compression technique capable of enhancing the image quality.

Additionally, if the changed region is a synthetic image and has a greater size resulting in great data, the server may encode the changed region by using the paletted PNG still image compression technique capable of reducing the size of data. The paletted PNG still image compression technique may guarantee a transmission speed because of a reduced data size of an image when encoding but may cause the degradation of an image quality since the color is expressed with 8 bits.

Additionally, the cloud streaming service method using a still image compression technique according to an embodiment of this invention performs a cloud streaming service based on a still image by sending the still-image-encoded changed region to a user (S630). By transmitting the changed region, compressed through encoding, to a user's terminal device, the user can experience as if an application is being executed at the user's terminal device.

Meanwhile, although not shown in FIG. 5, the cloud streaming service method using a still image compression technique according to an embodiment of this invention stores various kinds of information created in a cloud streaming service process according to an embodiment of this invention.

Figure 7:
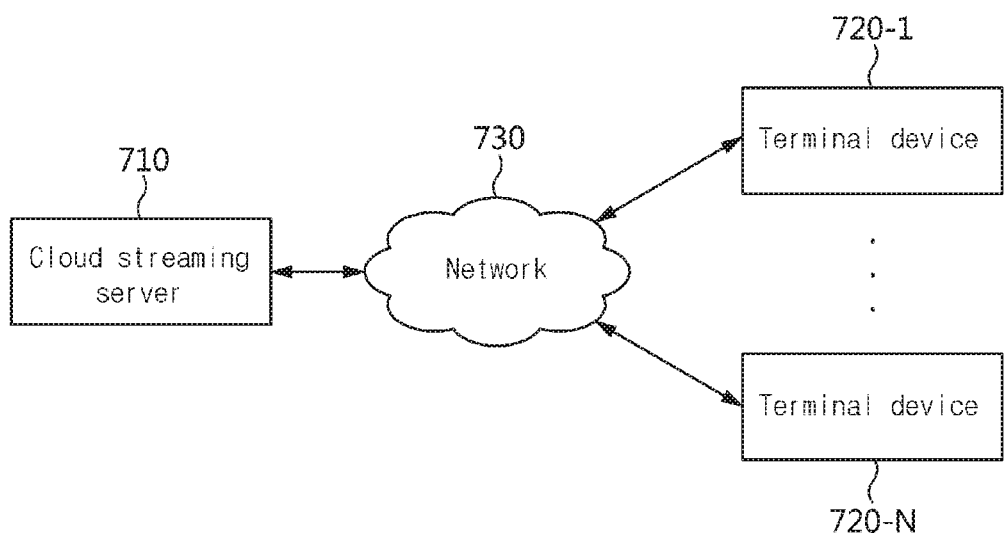
FIG. 7 is a block diagram illustrating a cloud streaming service system according to an embodiment of the present invention.

FIG. 7 is a block diagram illustrating a cloud streaming service system according to an embodiment of the present invention.

Referring to FIG. 7, the cloud streaming service system according to an embodiment of this invention includes a cloud streaming server 710, terminal devices 720-1 to 720-N, and a network 730.

The cloud streaming server 710 executes an application in response to a request for a cloud streaming service from the terminal devices 720-1 to 720-N and provides an execution resultant screen corresponding to a result of executing the application to the terminal devices 720-1 to 720-N.

The cloud streaming service basically applies a cloud streaming technique based on a video codec. Therefore, even when the cloud streaming technique is applied to a static screen such as a menu display, the cloud streaming service has been performed in an ineffective manner of unnecessarily capturing the entire screen and encoding with the video codec. In addition, when encoding for an image is performed, the cloud streaming service may determine an encoding technique by performing an image processing process that utilizes resources of the server. This may cause an increase in the load of the server. In order to solve these problems, the present invention provides the cloud streaming service system in which the cloud streaming server detects a changed region between frames in case of a smaller change between frames, such as a menu display screen, and encodes the changed region only through the still image compression technique.

The cloud streaming server 710 captures a changed region contained in a changed frame in comparison with a previous frame. Namely, compared with a screen corresponding to the previous frame, a different region in a screen corresponding to the changed frame may be captured as the changed region. In this case, the server may detect a section having a smaller frame change in all frames to be transmitted to the terminal devices 720-1 to 720-N and then capture the changed region in the detected section. At this time, by identifying an event type of an application occurring at the terminal devices 720-1 to 720-N, such a section having a smaller frame change may be detected.

Additionally, the cloud streaming server 710 determines an encoding technique by considering whether there is image feature information corresponding to the changed region, and performs a still image encoding of the changed region by using the encoding technique. In this case, the image feature information may be created based on an application source code or created using an MPEG texture descriptor. The server may determine the encoding technique based on the image feature information if there is the image feature information, and may also determine the encoding technique by analyzing an image corresponding to the changed region if there is no image feature information. The encoding technique may correspond to one of PNG (portable network graphics), paletted PNG (portable network graphics) and JPEG (joint photography experts group). The server may identify the changed region as one of a normal region and a picture region by analyzing the image corresponding to the changed region, and may also determine the encoding technique by considering at least one of an image processing result of the normal region and an image type of the picture region. The image type may correspond to one of a natural image and a synthetic image.

Also, the cloud streaming server 710 transmits the still-image-encoded changed region to a user, thus performing the cloud streaming service based on a still image.

The terminal devices 720-1 to 720-N receive an application execution result screen corresponding to the cloud streaming service from the cloud streaming server 710 and then provide it to a user.

The terminal devices 720-1 to 720-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 720-1 to 720-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 730 offers a route of delivering data between the cloud streaming server 710 and the terminal devices 720-1 to 720-N, including a typically used network and any future developable network. For example, the network 730 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 730 is not limited to the existing transmission scheme standard, and may include all transmission scheme standards to be developed in the future.

Also, the network used between the cloud streaming server 710 and the terminal devices 720-1 to 720-N in FIG. 7 may be different from or identical with a network between the terminal devices 720-1 to 720-N.

Figure 8:
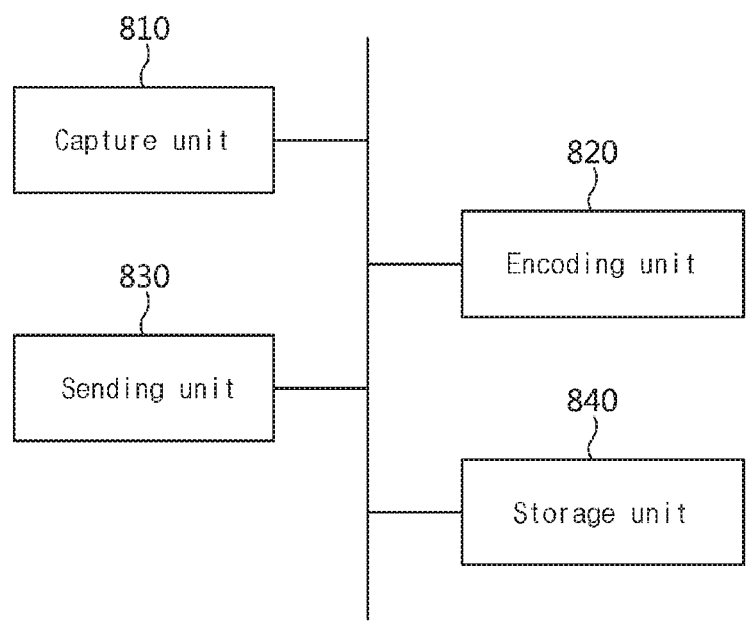
FIG. 8 is a block diagram illustrating an example of the cloud streaming server shown in FIG. 7.

FIG. 8 is a block diagram illustrating an example of the cloud streaming server shown in FIG. 7.

Referring to FIG. 8, the cloud streaming server 710 shown in FIG. 7 includes a capture unit 810, an encoding unit 820, a sending unit 830, and a storage unit 840.

The capture unit 810 captures a changed region contained in a changed frame. The cloud streaming technique based on the video codec may capture and encode all frames corresponding to a screen on which an application is running. However, if there is a smaller change between frames on the screen, the capture unit may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

The encoding unit 820 determines an encoding technique by considering whether there is image feature information corresponding to the changed region, and performs a still image encoding of the changed region by using the encoding technique. For example, the encoding technique may be determined depending on features of an image corresponding to the changed region, and such image features may be extracted based on the result of analysis through image processing. However, the image processing requires using resources of the cloud streaming server 710, and this may cause an increase in a system load. Therefore, if there is image feature information that includes information about features of the image corresponding to the changed region, the cloud streaming server 710 may determine the encoding technique by using this information and thereby can save resources thereof.

In this case, the image feature information may be created based on an application source code or created using an MPEG texture descriptor.

The application source code or the MPEG texture descriptor may include configuration information regarding an application result screen outputted in response to a user's request, or descriptors for indicating features regarding components that constitute the application result screen. For example, in case of the application source code, an extension of an image file corresponding to the changed region, such as JPG, GIF and PNG, or a feature corresponding to the size of an image using commands such as height and width may be extracted. Also, in case of the MPEG texture descriptor, the image feature information may be created using a texture descriptor, together with a color, an outline, a motion of an object or camera, etc., which deals with important visual features in the MPEG-7 standard visual field.

In addition, the image feature information may indicate characteristics and configuration information as to the entire area of a corresponding frame, as to the changed region in the frame, or as to a partial region in the changed region, namely, as to a normal region or a picture region.

Therefore, if it is possible to use such image feature information, various features including an image size, an image resolution, and an image type may be easily extracted without analyzing an image corresponding to the changed region.

If there is the image feature information, the encoding unit may determine the encoding technique based on the image feature information. If there is no image feature information, the encoding unit may determine the encoding technique by analyzing an image corresponding to the changed region. For example, if there is the image feature information corresponding to the changed region, the encoding unit may extract image features, such as an image size, an image resolution, and an image type, corresponding to the changed region by using the image feature information. Then the encoding unit may determine the encoding technique through the extracted image features. If there is no image feature information, the encoding unit may perform an image processing process and thereby extract image features, such as an image size, an image resolution, and an image type, as to an image corresponding to the changed region.

In addition to an image size, an image resolution, and an image type, other various kinds of image features may be extracted from the image feature information or extracted through the image processing.

The encoding technique may correspond to one of PNG (portable network graphics), paletted PNG (portable network graphics) and JPEG (joint photography experts group). The PNG still image compression technique may obtain a good quality of an image but may cause an increase in size of data when encoding. Therefore, if the bandwidth of a transmission network is low, a transmission speed may be lowered. The paletted PNG still image compression technique may guarantee a transmission speed because of a reduced data size of an image when encoding but may cause the degradation of an image quality since the color is expressed with 8 bits. The JPEG still image compression technique has a good compression efficiency and thus can considerably reduce the amount of transmission data when encoding but may cause a great system load because of a high compression efficiency when encoding and decoding.

The encoding unit may identify the changed region as one of a normal region and a picture region by analyzing an image corresponding to the changed region, and then determine the encoding technique by considering at least one of an image processing result of the normal region and an image type of the picture region. For example, the picture region may be a region formed of a file corresponding to an image format such as JPEG, PNG and GIF, and the normal region may be a region excepting the picture region in the changed region. Therefore, in case of the picture region, the features are given based on the image format. In case of the normal region, it is possible to determine the features through image processing when it is determined that the normal region is a captured image.

The image type may correspond to one of a natural image and a synthetic image. The natural image may refer to an image such as a photo or a picture, and the synthetic image may be an image made by mixture of several images.

If the image type is a natural image, the JPEG encoding technique may be more effective in view of compression efficiency when encoding is performed. If the image type is a synthetic image, the paletted PNG encoding technique capable of reducing the size of data may be effective in encoding.

The sending unit 830 performs a cloud streaming service based on a still image by sending the still-image-encoded changed region to a user. Namely, by transmitting the changed region, compressed through encoding, to a user's terminal device, the user can experience as if an application is being executed at the user's terminal device.

The storage unit 840 stores various kinds of the above-discussed information created in a cloud streaming service process according to an embodiment of this invention.

According to an embodiment, the storage unit 840 may be formed independently from the cloud streaming server 710 and support a function for the cloud streaming service. In this case, the storage unit 840 may operate as separate high-capacity storage and include a control function for the operation.

In addition, the above-discussed cloud streaming server 710 may be also implemented by means of one or more servers.

Meanwhile, the cloud streaming server 710 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 9:
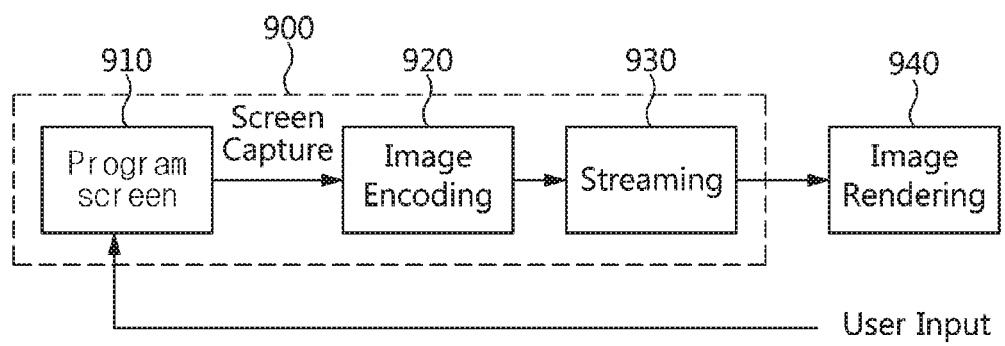
FIG. 9 is a diagram illustrating an example of a cloud streaming system based on a still image.

FIG. 9 is a diagram illustrating an example of a cloud streaming system based on a still image.

Referring to FIG. 9, a server 900 may execute a program screen 910 in response to a user input received from the user's terminal device and perform a screen capture. In this case, the server 900 may be a cloud streaming server or a web application server. A process of executing the program screen 910 and performing a screen capture may correspond to an operation flow of the capture unit 810 shown in FIG. 8.

The server 900 may perform an image encoding 920 of the captured program screen 910 through a still image compression technique. In this case, a process of performing the image encoding 920 may correspond to an operation flow of the encoding unit 820 shown in FIG. 8.

At this time, the server may capture a changed region only by comparing a changed frame with a previous frame. Also, the server may select one of encoding techniques such as PNG (portable network graphics), paletted PNG (portable network graphics) and PEG (joint photography experts group) by considering whether there is image feature information in the changed region, and then perform a still image encoding of the changed region through the selected encoding technique.

Thereafter, the server 900 may perform streaming 930 of the still-image-encoded changed region to the user's terminal device, thus providing a cloud streaming service based on a still image. In this case, a process of performing the streaming 930 may correspond to an operation flow of the sending unit 830 shown in FIG. 8.

Thereafter, the user's terminal device performs rendering 940 of received data and thereby display the program screen 910 to the user as if the program screen executed in an application in response to a user input is executed at the user's terminal device.

Figure 10:
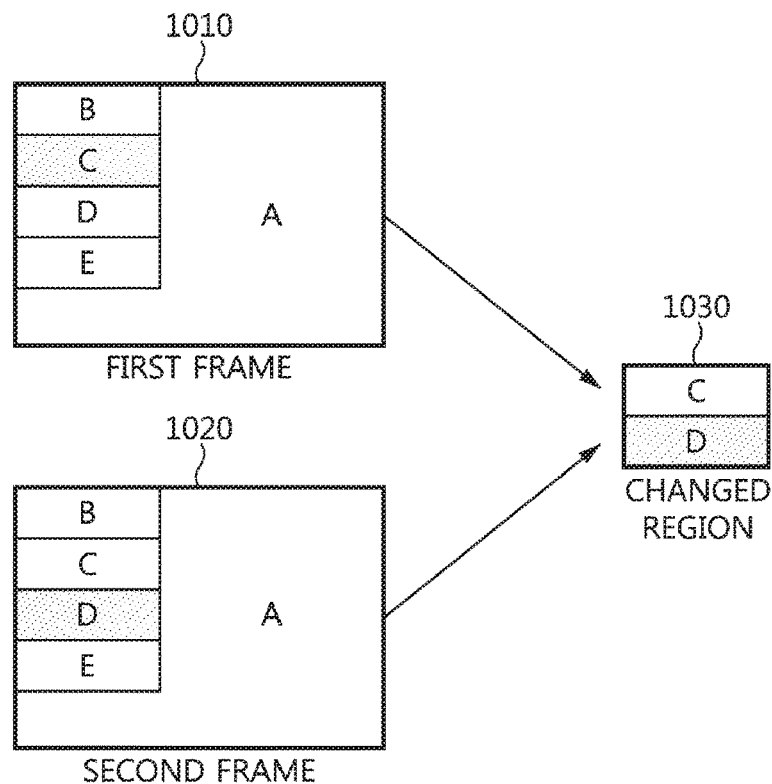
FIG. 10 is a diagram illustrating a process of capturing a changed region in a cloud streaming service according to an embodiment of the present invention.

FIG. 10 is a diagram illustrating a process of capturing a changed region in a cloud streaming service according to an embodiment of the present invention.

Referring to FIG. 10, the cloud streaming service based on a still image according to an embodiment of this invention may compare the first frame 1010 with the second frame 1020 and then capture and encode a changed region 1030 only.

For example, let's suppose that regions B, C, D and E in the first and second frames 1010 and 1020 are menu displays. In the first frame 1010, a cursor is located at the region C, so that the region C may be highlighted to be distinguished from the other regions B, D and E. In the second frame 1020, the cursor is moved from the region C to the region D, so that the region D may be highlighted to be distinguished from the other regions B, C and E.

In this case, as the result of comparison between the first and second frames 1010 and 1020, the regions C and D only may be captured as the changed region 1030. Also, the server may select an encoding technique by considering whether there is image feature information corresponding to the changed region 1030, and then perform a still image encoding of the changed region 1030 by using the selected encoding technique.

A typical cloud streaming service may perform encoding by capturing all frames, corresponding to a frame rate, including the first and second frames 1010 and 1020 which are certainly changed. However, the cloud streaming service based on a still image captures only the changed region 1030 and encodes it through the still image compression technique, thus improving the efficiency of a service in comparison with the typical cloud streaming service that unnecessarily captures many frames and the entire screen of such a frame.

Figure 11:
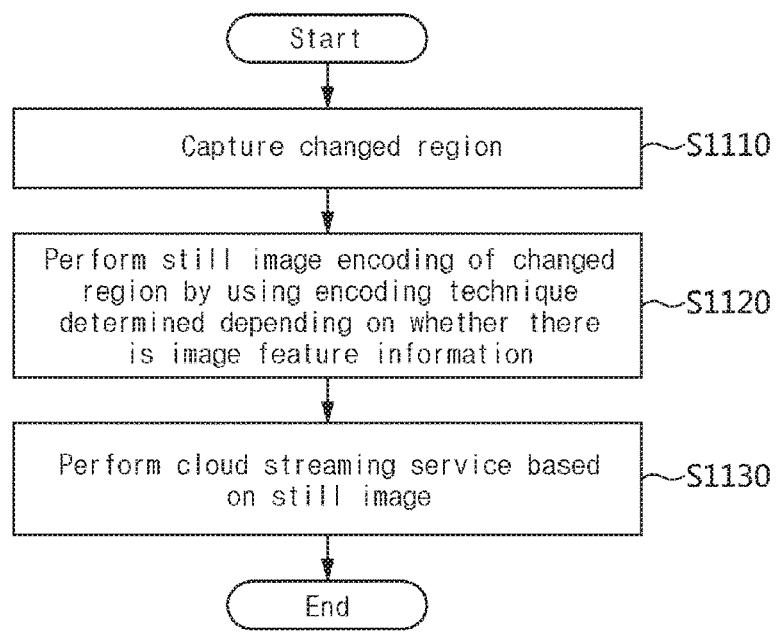
FIG. 11 is a flow diagram illustrating a cloud streaming service method using source information according to an embodiment of the present invention.

FIG. 11 is a flow diagram illustrating a cloud streaming service method using source information according to an embodiment of the present invention.

Referring to FIG. 11, the cloud streaming service method using source information according to an embodiment of this invention captures a changed region contained in a changed frame (S1110). The cloud streaming technique based on the video codec may capture and encode all frames corresponding to a screen on which an application is running. However, if there is a smaller change between frames on the screen, the server may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

Additionally, the cloud streaming service method using source information according to an embodiment of this invention determines an encoding technique by considering whether there is image feature information corresponding to the changed region, and performs a still image encoding of the changed region by using the encoding technique (S1120). For example, the encoding technique may be determined depending on features of an image corresponding to the changed region, and such image features may be extracted based on the result of analysis through image processing. However, the image processing requires using resources of the cloud streaming server, and this may cause an increase in a system load. Therefore, if there is image feature information that includes information about features of the image corresponding to the changed region, the cloud streaming server may determine the encoding technique by using this information and thereby can save resources thereof.

In this case, the image feature information may be created based on an application source code or created using an MPEG texture descriptor.

The application source code or the MPEG texture descriptor may include configuration information regarding an application result screen outputted in response to a user's request, or descriptors for indicating features regarding components that constitute the application result screen.

For example, in case of the application source code, an extension of an image file corresponding to the changed region, such as JPG, GIF and PNG, or a feature corresponding to the size of an image using commands such as height and width may be extracted. Also, in case of the MPEG texture descriptor, the image feature information may be created using a texture descriptor, together with a color, an outline, a motion of an object or camera, etc., which deals with important visual features in the MPEG-7 standard visual field.

In addition, the image feature information may indicate characteristics and configuration information as to the entire area of a corresponding frame, as to the changed region in the frame, or as to a partial region in the changed region, namely, as to a normal region or a picture region.

Therefore, if it is possible to use such image feature information, various features including an image size, an image resolution, and an image type may be easily extracted without analyzing an image corresponding to the changed region.

If there is the image feature information, the server may determine the encoding technique based on the image feature information. If there is no image feature information, the server may determine the encoding technique by analyzing an image corresponding to the changed region. For example, if there is the image feature information corresponding to the changed region, the server may extract image features, such as an image size, an image resolution, and an image type, corresponding to the changed region by using the image feature information. Then the server may determine the encoding technique through the extracted image features. If there is no image feature information, the server may perform an image processing process and thereby extract image features, such as an image size, an image resolution, and an image type, as to an image corresponding to the changed region.

In addition to an image size, an image resolution, and an image type, other various kinds of image features may be extracted from the image feature information or extracted through the image processing.

The encoding technique may correspond to one of PNG (portable network graphics), paletted PNG (portable network graphics) and JPEG (joint photography experts group). The PNG still image compression technique may obtain a good quality of an image but may cause an increase in size of data when encoding. Therefore, if the bandwidth of a transmission network is low, a transmission speed may be lowered. The paletted PNG still image compression technique may guarantee a transmission speed because of a reduced data size of an image when encoding but may cause the degradation of an image quality since the color is expressed with 8 bits. The PEG still image compression technique has a good compression efficiency and thus can considerably reduce the amount of transmission data when encoding but may cause a great system load because of a high compression efficiency when encoding and decoding.

The server may identify the changed region as one of a normal region and a picture region by analyzing an image corresponding to the changed region, and then determine the encoding technique by considering at least one of an image processing result of the normal region and an image type of the picture region. For example, the picture region may be a region formed of a file corresponding to an image format such as PEG, PNG and GIF, and the normal region may be a region excepting the picture region in the changed region. Therefore, in case of the picture region, the features are given based on the image format. In case of the normal region, it is possible to determine the features through image processing when it is determined that the normal region is a captured image.

The image type may correspond to one of a natural image and a synthetic image. The natural image may refer to an image such as a photo or a picture, and the synthetic image may be an image made by mixture of several images.

If the image type is a natural image, the PEG encoding technique may be more effective in view of compression efficiency when encoding is performed. If the image type is a synthetic image, the paletted PNG encoding technique capable of reducing the size of data may be effective in encoding.

Additionally, the cloud streaming service method using source information according to an embodiment of this invention performs a cloud streaming service based on a still image by sending the still-image-encoded changed region to a user (S1130). By transmitting the changed region, compressed through encoding, to a user's terminal device, the user can experience as if an application is being executed at the user's terminal device.

Figure 12:
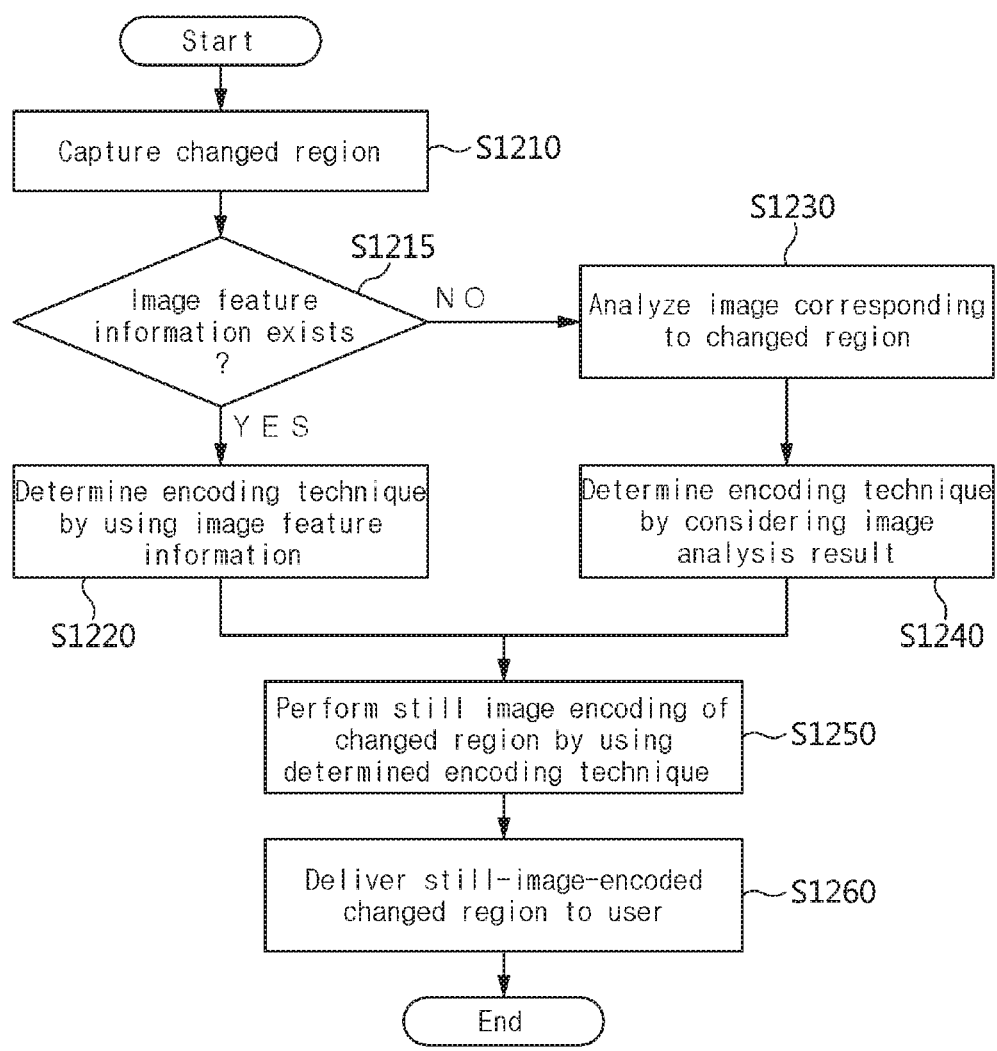
FIG. 12 is a flow diagram illustrating in detail a cloud streaming service method using source information according to an embodiment of the present invention.

FIG. 12 is a flow diagram illustrating in detail a cloud streaming service method using source information according to an embodiment of the present invention.

Referring to FIG. 12, in the cloud streaming service method using source information according to an embodiment of this invention, a cloud streaming server captures a changed region contained in a changed frame (S1210).

In this case, a certain region of a screen area corresponding to the changed frame that is different from a screen area corresponding to the previous frame may be captured as a changed region. In this case, a section having a smaller frame change may be detected in all frames to be transmitted to the user's terminal device, and the changed region may be captured in the detected section. At this time, by identifying an event type of an application occurring from the user's terminal device, such a section having a smaller frame change may be detected.

Thereafter, the server determines whether there is image feature information corresponding to the changed region (S1215).

In this case, the image feature information may be created based on an application source code or created using an MPEG texture descriptor.

If it is determined at step S1215 that there is the image feature information, the server determines an encoding technique, based on the image feature information (S1220).

If it is determined at step 1215 that there is no image feature information, the server analyzes an image corresponding to the changed region (S1230), and determines the encoding technique by considering the result of analysis (S1240).

The encoding technique may correspond to one of PNG (portable network graphics), paletted PNG (portable network graphics) and PEG (joint photography experts group).

Thereafter, the server performs a still image encoding of the changed region by using the determined encoding technique (S1250).

Thereafter, the server performs a cloud streaming service based on a still image by delivering the still-image-encoded changed region to a user (S1260).

Figure 13:
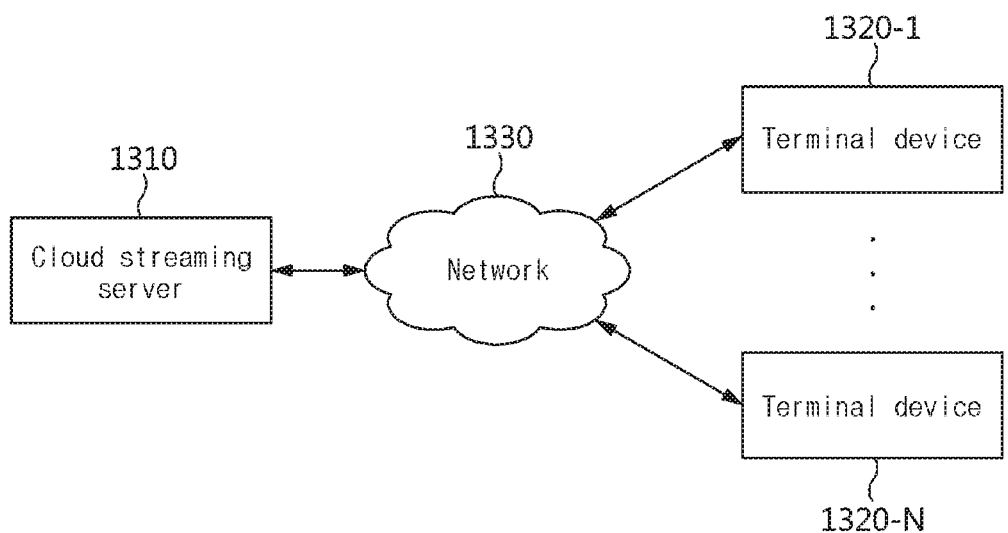
FIG. 13 is a block diagram illustrating a cloud streaming service system according to another embodiment of the present invention.

FIG. 13 is a block diagram illustrating a cloud streaming service system according to another embodiment of the present invention.

Referring to FIG. 13, the cloud streaming service system according to another embodiment of this invention includes a cloud streaming server 1310, terminal devices 1320-1 to 1320-N, and a network 1330.

The cloud streaming server 1310 executes an application in response to a request for a cloud streaming service from the terminal devices 1320-1 to 1320-N and provides an execution resultant screen corresponding to a result of executing the application to the terminal devices 1320-1 to 1320-N.

The cloud streaming server 1310 captures a changed region contained in a changed frame in comparison with a previous frame. Namely, compared with a screen corresponding to the previous frame, a different region in a screen corresponding to the changed frame may be captured as the changed region. In this case, the server may detect a section having a smaller frame change in all frames to be transmitted to the terminal devices 1320-1 to 1320-N and then capture the changed region in the detected section. At this time, by identifying an event type of an application occurring at the terminal devices 1320-1 to 1320-N, such a section having a smaller frame change may be detected.

Additionally, the cloud streaming server 1310 selects an encoding processing unit by considering one or more of an image feature and an image resolution corresponding to the changed region, and performs a still image encoding of the changed region corresponding to one frame by using the encoding processing unit. In this case, the encoding processing unit may be one of a central processing unit (CPU) and a graphics processing unit (GPU). In this case, the server may predict an encoding processing cost for each of the CPU and the GPU by considering one or more of the image feature and the image resolution, and perform the still image encoding of the changed region by selecting the encoding processing unit having a lower predicted encoding processing cost from among the CPU and the GPU. If the image resolution corresponding to the changed region is equal to or greater than a predetermined reference value, the server may perform the still image encoding of the changed region by using the GPU. If the image resolution corresponding to the changed region is smaller than the predetermined reference value, the server may select the encoding processing unit by considering a still image compression technique depending on the image feature. If the image resolution is smaller than the predetermined reference value and if the still image compression technique is the paletted PNG, the server may perform the still image encoding of the changed region by using the GPU.

Also, the cloud streaming server 1310 transmits the still-image-encoded changed region to a user, thus performing the cloud streaming service based on a still image.

The terminal devices 1320-1 to 1320-N receive an application execution result screen corresponding to the cloud streaming service from the cloud streaming server 1310 and then provide it to a user.

The terminal devices 1320-1 to 1320-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 1320-1 to 1320-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 1330 offers a route of delivering data between the cloud streaming server 1310 and the terminal devices 1320-1 to 1320-N, including a typically used network and any future developable network. For example, the network 1330 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 1330 is not limited to the existing transmission scheme standard, and may include all transmission scheme standards to be developed in the future. Also, the network used between the cloud streaming server 1310 and the terminal devices 1320-1 to 1320-N in FIG. 13 may be different from or identical with a network between the terminal devices 1320-1 to 1320-N.

Figure 14:
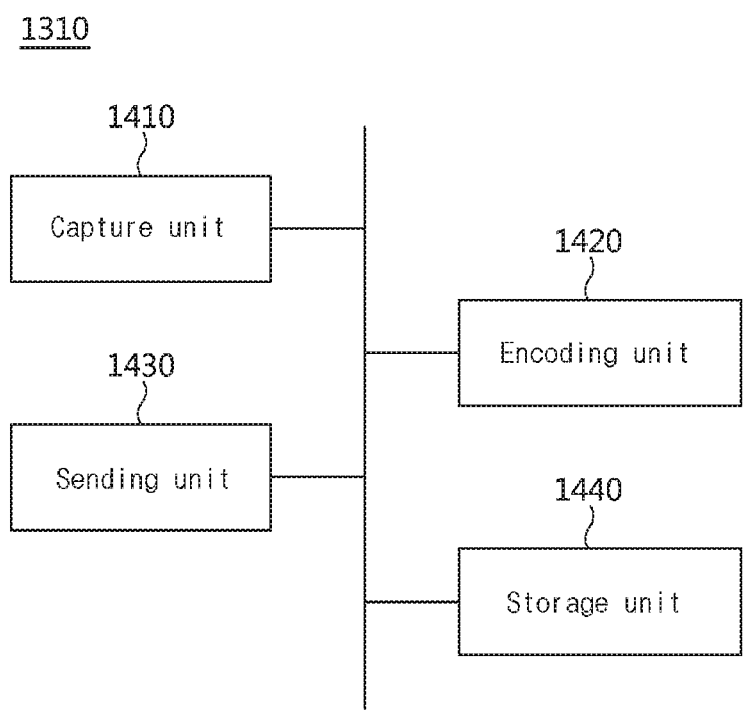
FIG. 14 is a block diagram illustrating an example of the cloud streaming server shown in FIG. 13.

FIG. 14 is a block diagram illustrating an example of the cloud streaming server shown in FIG. 13.

Referring to FIG. 14, the cloud streaming server 1310 shown in FIG. 13 includes a capture unit 1410, an encoding unit 1420, a sending unit 1430, and a storage unit 1440.

In an image cloud streaming service performed by detecting a changed region only, the image encoding may be performed using a central processing unit (CPU) or a graphics processing unit (GPU). Although a suitable combination of the CPU and the GPU is required to provide the optimal image cloud streaming service, a typical cloud streaming service merely uses a single unit for encoding. Therefore, this invention proposes a more efficient image cloud streaming service capable of selectively using an encoding processing unit suitable for a situation, based oil features related to the changed region.

The capture unit 1410 captures a changed region contained in a changed frame in comparison with a previous frame. The cloud streaming technique based on the video codec may capture and encode all frames corresponding to a screen on which an application is running. However, if there is a smaller change between frames on the screen, the capture unit may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various resolutions, and an image corresponding to the changed region may have various image types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

The encoding unit 1420 selects the encoding processing unit by considering one or more of an image feature and an image resolution, which correspond to the changed region, and then performs a still image encoding of the changed region corresponding to one frame by using the selected encoding processing unit.

The encoding processing unit may be one of a central processing unit (CPU) and a graphics processing unit (GPU).

The CPU, which is an essential part of a computer, may decode instructions and perform arithmetic logic operations or data processing. Therefore, a computation speed, the amount of data to be handled at one time, the size of a main memory region, and the like may greatly depend on the performance of the CPU. In case of encoding the changed region through the CPU, it is possible to directly perform encoding without delivering data for encoding to any other unit, thus incurring no cost associated with data delivery. However, if an image corresponding to the changed region has a higher resolution, it may take a long time to perform the encoding. Particularly, in case of repeating simple calculations such as performing a color quantization process in the paletted PNG still image compression technique, the encoding time may be increased.

The GPU is a processor, dedicated to 3D graphics operations, which has been developed to handle various light source effects and texture representation techniques so as to make a display screen more realistic after the introduction of 3D graphics. The GPU may be effective in repeating simple calculations or encoding an image having a greater resolution. However, encoding of the changed region through the GPU needs to receive data for encoding from the CPU and then return encoded data to the CPU. This may incur an additional cost.

In this case, the server may predict an encoding processing cost for each of the CPU and the GPU by considering one or more of the image feature and the image resolution, and perform the still image encoding of the changed region by selecting the encoding processing unit having a lower predicted encoding processing cost from among the CPU and the GPU. For example, in order to perform the encoding for a changed region A, the server may determine the image feature and the image resolution which correspond to the changed region A. Then, based on the image feature and the image resolution determined for the changed region A, the server may predict an encoding processing cost to be incurred when encoding will be performed through each of the CPU and the GPU. Between both, an encoding processing unit having a lower predicted encoding processing cost may be selected to perform encoding of the changed region A.

In addition, the server may create statistics of encoding processing costs after the encoding is performed. For example, the server may define a certain unit period in the cloud streaming service and update the statistics of encoding processing costs by using stored information about the encoding processing cost for each unit period. The statistics of encoding processing costs may be created as detailed statistical information for each of the image feature, the image resolution, and the encoding processing unit. Based on the created statistical information, it is possible to increate the reliability of the cloud streaming service method using a selective encoding processing unit.

If the image resolution corresponding to the changed region is equal to or greater than a predetermined reference value, the server may perform the still image encoding of the changed region by using the GPU.

A resolution may indicate how many pixels or dots are used to represent an image. Usually, the unit of resolution is ppi (pixel per inch) indicating how many pixels are used per inch, and dpi (dot per inch) indicating how many dots are used per inch. As the number of pixels or dots is higher, a precise image having a higher resolution may be represented. Namely, the higher the resolution, the cleaner and sharper the image. This, however, needs a high-volume memory for processing the image because of an increase in dots per inch, thus resulting in a slower computer processing speed. For example, when an image having a high resolution is encoded through the CPU, the encoding processing time may be increased, which incurs a high encoding processing cost.

Therefore, when the image resolution corresponding to the changed region is equal to or greater than the predetermined reference value, the server may save the encoding processing cost by performing the encoding through the GPU, as compared with encoding through the CPU.

If the image resolution corresponding to the changed region is smaller than the predetermined reference value, the server may select the encoding processing unit by considering a still image compression technique depending on the image feature corresponding to the changed region. If the image resolution corresponding to the changed region is smaller than the predetermined reference value, the CPU may perform the encoding without a need to deliver data for encoding to the GPU. However, even though the image resolution is low, simple calculations may be repeated depending on the still image compression technique which is selected according to the image feature corresponding to the changed region. Therefore, the server may select the encoding processing unit by further considering the image type of the changed region.

In addition, the still image compression technique may be determined according to the image feature, such as an image size or an image type, which corresponds to the changed region.

In this case, the still image compression technique may correspond to one of PNG (portable network graphics), paletted PNG (portable network graphics) and JPEG (joint photography experts group). The PNG still image compression technique may obtain a good quality of an image but may cause an increase in size of data when encoding. Therefore, if the bandwidth of a transmission network is low, a reaction speed may be lowered. The paletted PNG still image compression technique may reduce a data size but may cause the degradation of an image quality. In particular, because of a color quantization process for reducing a data size, a process of repeating simple calculations may be involved. The JPEG still image compression technique may have a good compression efficiency depending on the image type but may cause a great load because of a high compression efficiency when encoding and decoding.

If the image resolution is smaller than the predetermined reference value and if the still image compression technique is the paletted PNG the server may perform a still image encoding of the changed region by using the GPU. For example, if the encoding is performed using the paletted PNG still image compression technique in view of the image feature of the changed region, the encoding processing time may be increased because of repetition of simple calculations such as color quantization. Therefore, in this case, the cloud streaming service may be performed with smaller encoding processing cost through encoding using the GPU in comparison with encoding using the CPU.

The sending unit 1430 performs a cloud streaming service based on a still image by sending the still-image-encoded changed region to a user. Namely, by transmitting the changed region, compressed through encoding, to a user's terminal device, the user can experience as if an application is being executed at the user's terminal device.

The storage unit 1440 stores various kinds of the above-discussed information created in a cloud streaming service process according to an embodiment of this invention.

According to an embodiment, the storage unit 1440 may be formed independently from the cloud streaming server 1310 and support a function for the cloud streaming service. In this case, the storage unit 1440 may operate as separate high-capacity storage and include a control function for the operation.

In addition, the above-discussed cloud streaming server 1310 may be also implemented by means of one or more servers.

Meanwhile, the cloud streaming server 1310 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 15:
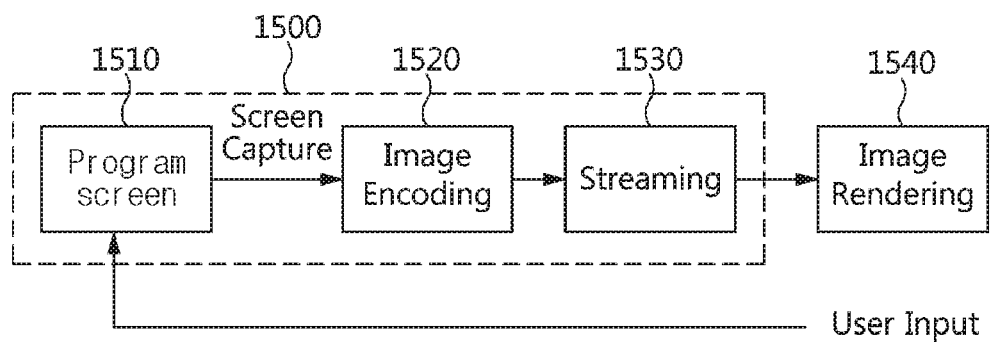
FIG. 15 is a diagram illustrating another example of a cloud streaming system based on a still image.

FIG. 15 is a diagram illustrating another example of a cloud streaming system based on a still image.

Referring to FIG. 15, a server 1500 may execute a program screen 1510 in response to a user input received from the user's terminal device and perform a screen capture. In this case, the server 1500 may be a cloud streaming server or a web application server. A process of executing the program screen 1510 and performing a screen capture may correspond to an operation flow of the capture unit 1410 shown in FIG. 14.

The server 1500 may perform an image encoding 1520 of the captured program screen 1510 through a still image compression technique. In this case, a process of performing the image encoding 1520 may correspond to an operation flow of the encoding unit 1420 shown in FIG. 14.

In this case, the server may capture a changed region only by comparing a changed frame with a previous frame. Also, the server may select one of a CPU and a GPU by considering an image feature of the changed region and an image resolution corresponding to the changed region, and then perform a still image encoding of the changed region by using the selected encoding processing unit.

Thereafter, the server 1500 may perform streaming 1530 of the still-image-encoded changed region to the user's terminal device, thus providing a cloud streaming service based on a still image. In this case, a process of performing the streaming 1530 may correspond to an operation flow of the sending unit 1430 shown in FIG. 14.

Thereafter, the user's terminal device performs rendering 1540 of received data and thereby display the program screen 1510 to the user as if the program screen executed in an application in response to a user input is executed at the user's terminal device.

Figure 16:
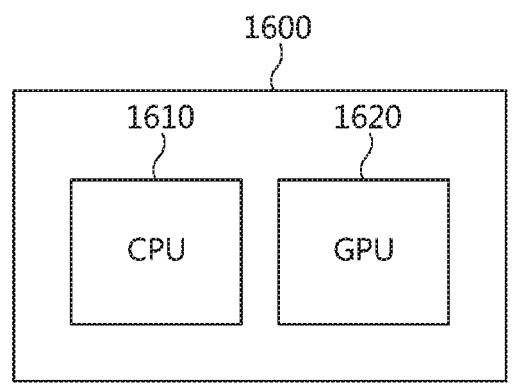
FIG. 16 is a diagram illustrating an encoding processing unit according to an embodiment of the present invention.

FIG. 16 is a diagram illustrating an encoding processing unit according to an embodiment of the present invention.

Referring to FIG. 16, the encoding processing unit according to an embodiment of this invention may be classified into a central processing unit (CPU) 1610 and a graphics processing unit (GPU) 1620.

The CPU 1610, which is an essential part of a computer, may decode instructions and perform arithmetic logic operations or data processing. Therefore, a computation speed, the amount of data to be handled at one time, the size of a main memory region, and the like may greatly depend on the performance of the CPU. In case of encoding the changed region through the CPU, it is possible to directly perform encoding without delivering data for encoding to any other unit, thus incurring no cost associated with data delivery. However, if an image corresponding to the changed region has a higher resolution, it may take a long time to perform the encoding. Particularly, in case of repeating simple calculations such as performing a color quantization process in the paletted PNG still image compression technique, the encoding time may be increased.

The GPU 1620 is a processor, dedicated to 3D graphics operations, which has been developed to handle various light source effects and texture representation techniques so as to make a display screen more realistic after the introduction of 3D graphics. The GPU may be effective in repeating simple calculations or encoding an image having a greater resolution. However, encoding of the changed region through the GPU needs to receive data for encoding from the CPU and then return encoded data to the CPU. This may incur an additional cost.

As shown in FIG. 16, the CPU 1610 and the GPU 1620 may independently exist in a server 1600. Contrary to FIG. 16, the CPU 1610 and the GPU 1620 may be united into a single apparatus, or the GPU 1620 may be contained in the GPU 1610. Any other configuration may be possible.

In addition, the CPU 1610 and the GPU 1620 may be connected with each other so as to transmit and receive data.

Figure 17:
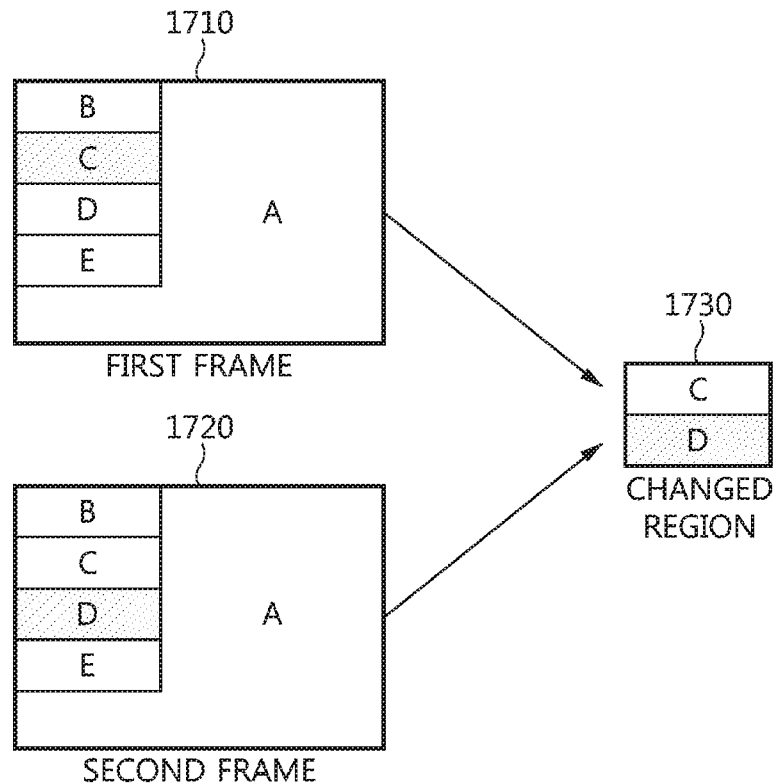
FIG. 17 is a diagram illustrating a process of capturing a changed region in a cloud streaming service according to another embodiment of the present invention.

FIG. 17 is a diagram illustrating a process of capturing a changed region in a cloud streaming service according to another embodiment of the present invention.

Referring to FIG. 17, the cloud streaming service based on a still image according to an embodiment of this invention may compare the first frame 1710 with the second frame 1720 and then capture and encode a changed region 1730 only.

For example, let's suppose that regions B, C, D and E in the first and second frames 1710 and 1720 are menu displays. In the first frame 1710, a cursor is located at the region C, so that the region C may be highlighted to be distinguished from the other regions B, D and E. In the second frame 1720, the cursor is moved from the region C to the region D, so that the region D may be highlighted to be distinguished from the other regions B, C and E.

In this case, as the result of comparison between the first and second frames 1710 and 1720, the regions C and D only may be captured as the changed region 1730. Also, the server may select an encoding processing unit by considering an image resolution of the changed region 1730 and an image type corresponding to the changed region 1730, and then perform a still image encoding of the changed region 1730 by using the selected encoding processing unit.

A typical cloud streaming service may perform encoding by capturing all frames, corresponding to a frame rate, including the first and second frames 1710 and 1720 which are certainly changed. However, the cloud streaming service based on a still image captures only the changed region 1730 and encodes it through the still image compression technique, thus improving the efficiency of a service in comparison with the typical cloud streaming service that unnecessarily captures many frames and the entire screen of such a frame.

Figure 18:
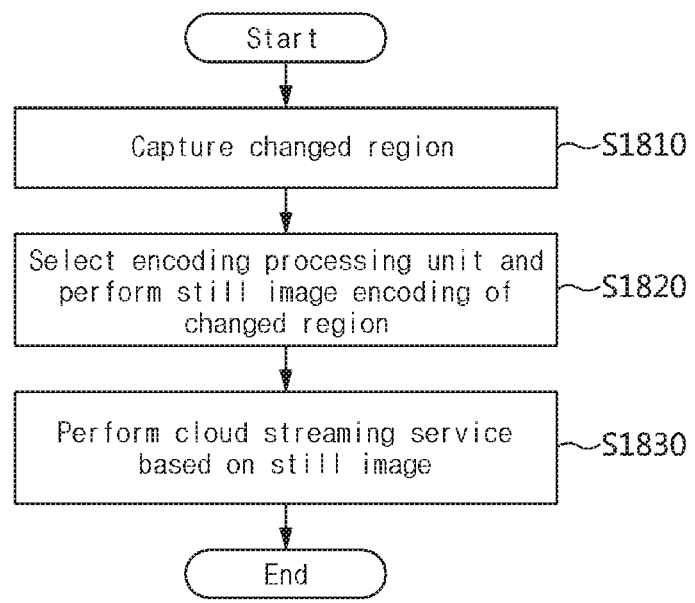
FIG. 18 is a flow diagram illustrating a cloud streaming service method using a selective encoding processing unit according to an embodiment of the present invention.

FIG. 18 is a flow diagram illustrating a cloud streaming service method using a selective encoding processing unit according to an embodiment of the present invention.

Referring to FIG. 18, the cloud streaming service method using a selective encoding processing unit according to an embodiment of this invention captures a changed region contained in a changed frame in comparison with a previous frame (S1810). The cloud streaming technique based on the video codec may capture and encode all frames corresponding to a screen on which an application is running. However, if there is a smaller change between frames on the screen, the server may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

Additionally, the cloud streaming service method using a selective encoding processing unit according to an embodiment of this invention selects the encoding processing unit by considering one or more of an image feature and an image resolution, which correspond to the changed region, and then performs a still image encoding of the changed region corresponding to one frame by using the selected encoding processing unit (S1820).

The encoding processing unit may be one of a central processing unit (CPU) and a graphics processing unit (GPU).

The CPU, which is an essential part of a computer, may decode instructions and perform arithmetic logic operations or data processing. Therefore, a computation speed, the amount of data to be handled at one time, the size of a main memory region, and the like may greatly depend on the performance of the CPU. In case of encoding the changed region through the CPU, it is possible to directly perform encoding without delivering data for encoding to any other unit, thus incurring no cost associated with data delivery. However, if an image corresponding to the changed region has a higher resolution, it may take a long time to perform the encoding. Particularly, in case of repeating simple calculations such as performing a color quantization process in the paletted PNG still image compression technique, the encoding time may be increased.

The GPU is a processor, dedicated to 3D graphics operations, which has been developed to handle various light source effects and texture representation techniques so as to make a display screen more realistic after the introduction of 3D graphics. The GPU may be effective in repeating simple calculations or encoding an image having a greater resolution. However, encoding of the changed region through the GPU needs to receive data for encoding from the CPU and then return encoded data to the CPU. This may incur an additional cost.

In this case, the server may predict an encoding processing cost for each of the CPU and the GPU by considering one or more of the image feature and the image resolution, and perform the still image encoding of the changed region by selecting the encoding processing unit having a lower predicted encoding processing cost from among the CPU and the GPU. For example, in order to perform the encoding for a changed region A, the server may determine the image feature and the image resolution which correspond to the changed region A. Then, based on the image feature and the image resolution determined for the changed region A, the server may predict an encoding processing cost to be incurred when encoding will be performed through each of the CPU and the GPU. Between both, an encoding processing unit having a lower predicted encoding processing cost may be selected to perform encoding of the changed region A.

In addition, the server may create statistics of encoding processing costs after the encoding is performed. For example, the server may define a certain unit period in the cloud streaming service and update the statistics of encoding processing costs by using stored information about the encoding processing cost for each unit period. The statistics of encoding processing costs may be created as detailed statistical information for each of the image feature, the image resolution, and the encoding processing unit. Based on the created statistical information, it is possible to increate the reliability of the cloud streaming service method using a selective encoding processing unit.

If the image resolution corresponding to the changed region is equal to or greater than a predetermined reference value, the server may perform the still image encoding of the changed region by using the GPU.

A resolution may indicate how many pixels or dots are used to represent an image. Usually, the unit of resolution is ppi (pixel per inch) indicating how many pixels are used per inch, and dpi (dot per inch) indicating how many dots are used per inch. As the number of pixels or dots is higher, a precise image having a higher resolution may be represented. Namely, the higher the resolution, the cleaner and sharper the image. This, however, needs a high-volume memory for processing the image because of an increase in dots per inch, thus resulting in a slower computer processing speed. For example, when an image having a high resolution is encoded through the CPU, the encoding processing time may be increased, which incurs a high encoding processing cost.

Therefore, when the image resolution corresponding to the changed region is equal to or greater than the predetermined reference value, the server may save the encoding processing cost by performing the encoding through the GPU, as compared with encoding through the CPU.

If the image resolution corresponding to the changed region is smaller than the predetermined reference value, the server may select the encoding processing unit by considering a still image compression technique depending on the image feature corresponding to the changed region. If the image resolution corresponding to the changed region is smaller than the predetermined reference value, the CPU may perform the encoding without a need to deliver data for encoding to the GPU. However, even though the image resolution is low, simple calculations may be repeated depending on the still image compression technique which is selected according to the image feature corresponding to the changed region. Therefore, the server may select the encoding processing unit by further considering the image type of the changed region.

In addition, the still image compression technique may be determined according to the image feature, such as an image size or an image type, which corresponds to the changed region.

In this case, the still image compression technique may correspond to one of PNG (portable network graphics), paletted PNG (portable network graphics) and JPEG (joint photography experts group). The PNG still image compression technique may obtain a good quality of an image but may cause an increase in size of data when encoding. Therefore, if the bandwidth of a transmission network is low, a reaction speed may be lowered. The paletted PNG still image compression technique may reduce a data size but may cause the degradation of an image quality. In particular, because of a color quantization process for reducing a data size, a process of repeating simple calculations may be involved. The PEG still image compression technique may have a good compression efficiency depending on the image type but may cause a great load because of a high compression efficiency when encoding and decoding.

If the image resolution is smaller than the predetermined reference value and if the still image compression technique is the paletted PNG the server may perform a still image encoding of the changed region by using the GPU. For example, if the encoding is performed using the paletted PNG still image compression technique in view of the image feature of the changed region, the encoding processing time may be increased because of repetition of simple calculations such as color quantization. Therefore, in this case, the cloud streaming service may be performed with smaller encoding processing cost through encoding using the GPU in comparison with encoding using the CPU.

Additionally, the cloud streaming service method using a selective encoding processing unit according to an embodiment of this invention performs a cloud streaming service based on a still image by sending the still-image-encoded changed region to a user (S1830). By transmitting the changed region, compressed through encoding, to a user's terminal device, the user can experience as if an application is being executed at the user's terminal device.

Meanwhile, although not shown in FIG. 18, the cloud streaming service method using a selective encoding processing unit according to an embodiment of this invention may store various kinds of information created in a cloud streaming service process.

Figure 19:
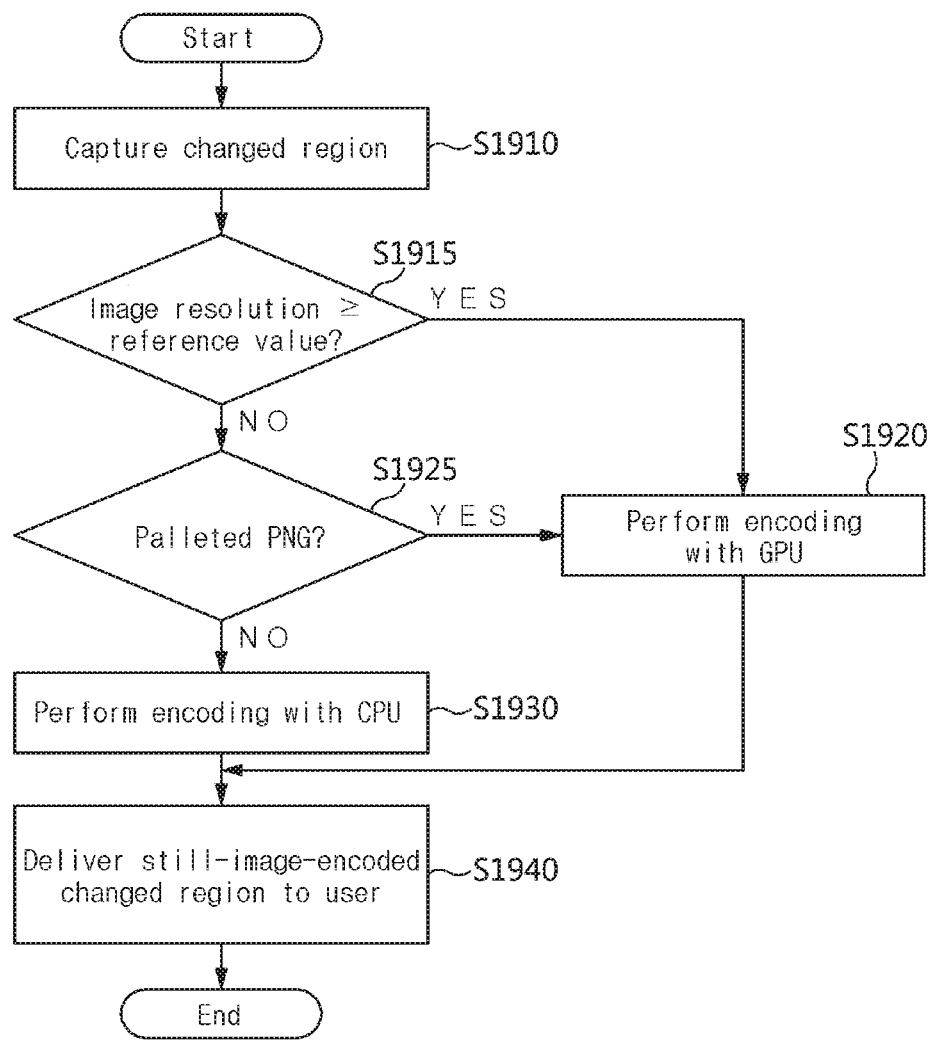
FIG. 19 is a flow diagram illustrating in detail a cloud streaming service method using a selective encoding processing unit according to an embodiment of the present invention.

FIG. 19 is a flow diagram illustrating in detail a cloud streaming service method using a selective encoding processing unit according to an embodiment of the present invention.

Referring to FIG. 19, in the cloud streaming service method using a selective encoding processing unit according to an embodiment of this invention, a cloud streaming server captures a changed region contained in a changed frame in comparison with a previous frame (S1910).

Thereafter, the server determines whether the resolution of an image corresponding to the changed region is equal to or greater than a predetermined reference value (S1915).

If it is determined at step S1915 that the image resolution is equal to or greater than the reference value, the server encode the changed region through the GPU (S1920).

If it is determined at step S1915 that the image resolution is smaller than the reference value, the server determines whether a still image compression technique for encoding the changed region is the paletted PNG still image compression technique (S1925).

If it is determined at step S1925 that the still image compression technique for encoding the changed region is the paletted PNG still image compression technique, the server encodes the changed region through the GPU (S1920).

If it is determined at step S1925 that the still image compression technique for encoding the changed region is not the paletted PNG still image compression technique, the server encodes the changed region through the CPU (S1930). At this time, the still image compression technique for encoding the changed region may correspond to one of the PNG still image compression technique and the PEG still image compression technique.

Thereafter, the server performs a cloud streaming service based on a still image by transmitting the still-image-encoded changed region to a user (S1940).

Figure 20:
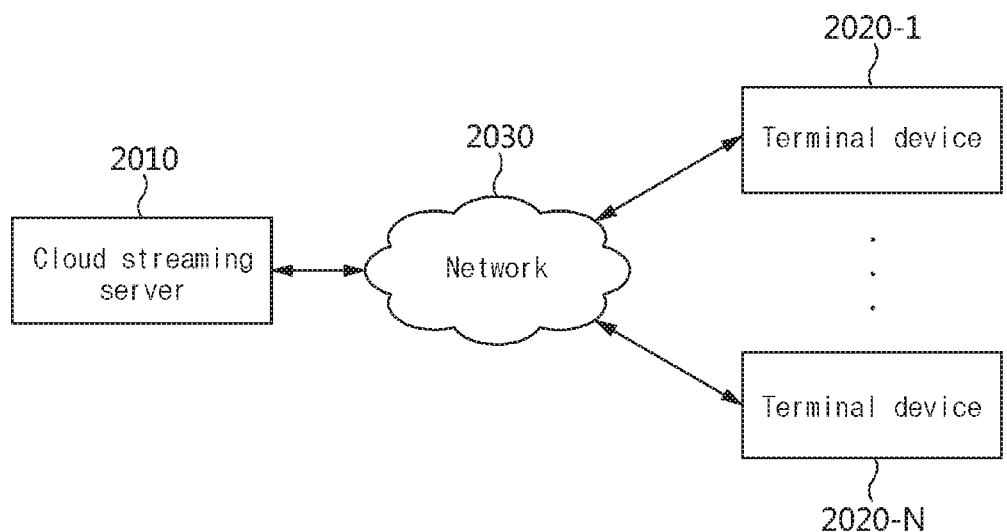
FIG. 20 is a block diagram illustrating a cloud streaming service system according to yet another embodiment of the present invention.

FIG. 20 is a block diagram illustrating a cloud streaming service system according to yet another embodiment of the present invention.

Referring to FIG. 20, the cloud streaming service system according to an embodiment of this invention includes a cloud streaming server 2010, terminal devices 2020-1 to 2020-N, and a network 2030.

The cloud streaming server 2010 executes an application in response to a request for a cloud streaming service from the terminal devices 2020-1 to 2020-N and provides an execution resultant screen corresponding to a result of executing the application to the terminal devices 2020-1 to 2020-N.

The cloud streaming server 2010 captures a changed region contained in a changed frame. Namely, compared with a screen corresponding to the previous frame, a different region in a screen corresponding to the changed frame may be captured as the changed region. In this case, the server may detect a section having a smaller frame change in all frames to be transmitted to the terminal devices 2020-1 to 2020-N and then capture the changed region in the detected section. At this time, by identifying an event type of an application occurring at the terminal devices 2020-1 to 2020-N, such a section having a smaller frame change may be detected.

Additionally, the cloud streaming server 2010 divides an encoding process for the changed region into a plurality of unit processes, allocates at least one of the unit processes to a graphics processing unit (GPU), allocates remaining unit processes to a central processing unit (CPU), and performs the encoding process for a still image encoding of the changed region. In this case, each of the unit processes may correspond to one of an image analysis, a still image compression technique determination, a still image compression, and a compression data collection. The server may allocate the unit process corresponding to the still image compression to the GPU, based on a processing result corresponding to the image analysis and the still image compression technique determination. The still image compression may include, for an image corresponding to the changed region, at least one of a color histogram construction, a palette creation, a palette-based original color quantization, and a palette-based encoding. The GPU may deliver a processing result corresponding to the still image compression to the CPU. The CPU may perform the unit process corresponding to the compression data collection by using a processing result corresponding to the still image compression. The CPU may deliver image data corresponding to the changed region to the GPU when the unit process corresponding to the still image compression is allocated to the GPU.

Also, the cloud streaming server 2010 transmits the still-image-encoded changed region to a user, thus performing the cloud streaming service based on a still image.

The terminal devices 2020-1 to 2020-N receive an application execution result screen corresponding to the cloud streaming service from the cloud streaming server 2010 and then provide it to a user.

The terminal devices 2020-1 to 2020-N are connected to the communication network and, based on a cloud computing system, can execute an application. The terminal devices may be, but not limited to mobile communication terminals, various devices such as information communication devices, multimedia devices, wired devices, stationary devices, and internet protocol (IP) devices. Also, each of the terminal devices 2020-1 to 2020-N may be a mobile device, having various mobile communication specifications, such as a mobile phone, a portable multimedia player (PMP), a mobile internet device (MID), a smart phone, a desktop, a tablet PC, a notebook, a net book, a personal digital assistant (PDA), a smart phone, and an information communication device.

The network 2030 offers a route of delivering data between the cloud streaming server 2010 and the terminal devices 2020-1 to 2020-N, including a typically used network and any future developable network. For example, the network 2030 may be a wired/wireless short-range communication network for providing communication of various information devices within a limited area, a mobile communication network for providing communication between mobile entities and between a mobile entity and any other entity outside the mobile entity, a satellite communications network for providing communication between earth stations using satellites, one of wired/wireless communication networks, or any combination thereof. Meanwhile, the standard of transmission scheme for the network 2030 is not limited to the existing transmission scheme standard, and may include all transmission scheme standards to be developed in the future. Also, the network used between the cloud streaming server 2010 and the terminal devices 2020-1 to 2020-N in FIG. 20 may be different from or identical with a network between the terminal devices 2020-1 to 2020-N.

Figure 21:
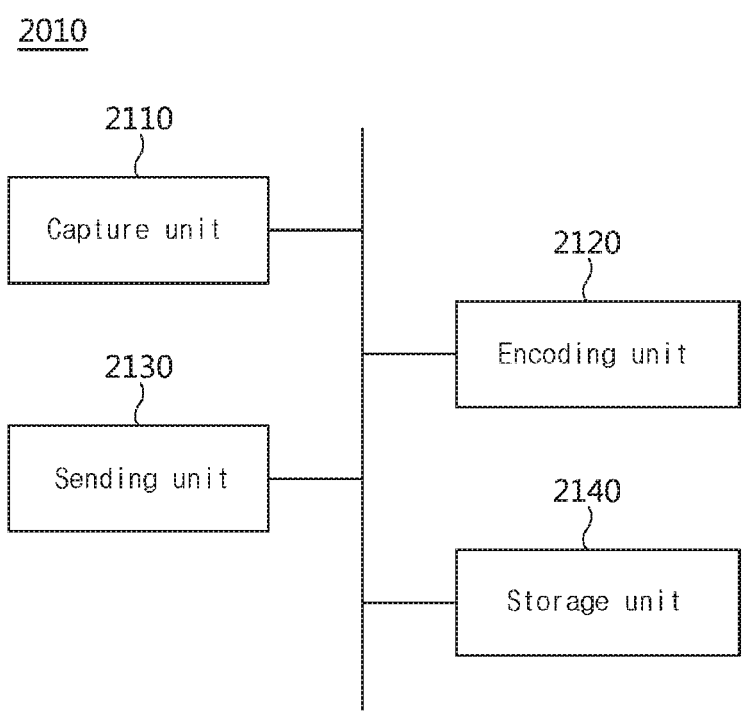
FIG. 21 is a block diagram illustrating an example of the cloud streaming server shown in FIG. 20.

FIG. 21 is a block diagram illustrating an example of the cloud streaming server shown in FIG. 20.

Referring to FIG. 21, the cloud streaming server 2010 shown in FIG. 20 includes a capture unit 2110, an encoding unit 2120, a sending unit 2130, and a storage unit 2140.

In an image cloud streaming service performed by detecting a changed region only, the image encoding may be performed using a central processing unit (CPU) or a graphics processing unit (GPU). Although a suitable combination of the CPU and the GPU is required together with divided encoding processes to provide the optimal image cloud streaming service, a typical cloud streaming service merely uses a single unit for encoding. Therefore, this invention proposes a more efficient image cloud streaming service capable of dividing an encoding process into unit processes each of which is allocated to the CPU or the GPU.

The capture unit 2110 captures a changed region contained in a changed frame. The cloud streaming technique based on the video codec may capture and encode all frames corresponding to a screen on which an application is running. However, if there is a smaller change between frames on the screen, the capture unit may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various resolutions, and an image corresponding to the changed region may have various image types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

The encoding unit 2120 divides an encoding process for the changed region into a plurality of unit processes, allocates at least one of the unit processes to a graphics processing unit (GPU), allocates remaining unit processes to a central processing unit (CPU), and performs the encoding process for a still image encoding of the changed region.

When the cloud streaming server encodes an image corresponding to the changed region, a typical service method using the CPU only fails to use the entire available resources of the cloud streaming server and thus may cause the degradation of a service quality due to a time delay in image encoding. Therefore, in order to solve such a problem of the typical service method, the present invention divides an encoding process into a plurality of unit processes and properly allocates the respective unit processes to the CPU and the GPU.

In this case, each of the unit processes may correspond to one of an image analysis, a still image compression technique determination, a still image compression, and a compression data collection. The image analysis may be a process of analyzing the feature of an image corresponding to the changed region. For example, the encoding unit may analyze image features such as an image size, an image resolution and an image type and then use them as data for performing an efficient encoding.

Additionally, by performing a unit process corresponding to the still image compression technique determination, the encoding unit may use the resource of the cloud streaming server more efficiently when performing the compression of the changed region. Thereafter, the encoding unit may perform a process corresponding to the compression data collection by using the result of a still image compression of at least one image corresponding to the changed region.

In this case, the encoding unit may allocate a unit process corresponding to the still image compression to the GPU, based on the processing results corresponding to the image analysis and the still image compression technique determination. For example, as the processing results corresponding to the image analysis and the still image compression technique determination, a paletted PNG (portable network graphics) still image compression technique may be determined as a still image compression technique for encoding the changed region. In this case, a process of performing the still image encoding through the paletted PNG still image compression technique may include the repetition of simple calculations or a calculation process to be processed in parallel. Therefore, in this case, by allocating a unit process for performing the still image compression to the GPU among the unit processes, the encoding unit may save an encoding time and thus efficiently use the resources of the cloud streaming server.

Additionally, the encoding unit may perform a unit process corresponding to the still image compression through the GPU, depending on the system setting and regardless of the processing results corresponding to the image analysis and the still image compression technique determination. If the cloud streaming system is formed of the CPU only, all processes should be performed using the CPU. This may cause a high possibility of latency delay when the cloud streaming service is provided to a user's terminal. Therefore, by having one or more CPUs, performing a unit process corresponding to the still image compression through the GPU, and delivering a processing result to the CPU, the encoding unit may reduce a management cost of the cloud streaming system and also reduce the latency delay.

In this case, for an image corresponding to the changed region, the still image compression may include one or more processes of a color histogram construction, a palette creation, a palette-based original color quantization, and a palette-based encoding. The color histogram construction may be performed to create a palette for the image corresponding to the changed region. The palette creation may be a process of creating a palette with the minimal loss relative to the original image, i.e., the image corresponding to the changed region, by using a color histogram. Based on the created palette, the encoding unit may perform the original color quantization by replacing the color of the image corresponding to the changed region with the color corresponding to the palette, and then perform the palette-based encoding.

The GPU may deliver the processing result corresponding to the still image compression to the CPU. For example, the GPU may perform a unit process corresponding to the still image compression as to the changed regions contained in the plurality of changed frames, and deliver each processing result to the CPU for performing a unit process corresponding to the compression data collection. Like this, when the encoding process is divided into unit processes each of which is performed by one of the CPU and the GPU, any resource consumption cost for delivery of a processing result may occur additionally. However, because the resource efficiency benefit obtained from a divided encoding process is greater than the resource consumption cost that may be incurred additionally, the above encoding method may be more efficient.

In this case, the CPU may perform a unit process corresponding to the compression data collection by using the processing result corresponding to the still image compression. For example, if there are a plurality of processing results corresponding to the still image compression created through the GPU, the encoding unit may collect the respective processing results, i.e., compression data. Because this invention has an object of providing a cloud streaming service based on a still image to a user's terminal device by performing an encoding process, the encoding unit may collect a plurality of compression data and perform the encoding process so as to provide the service to the user's terminal device.

If a unit process corresponding to the still image compression is allocated to the GPU, the CPU may deliver image data corresponding to the changed region to the GPU. Depending on the processing results of the unit processes corresponding to the image analysis and the still image compression technique determination, it may be determined whether the unit process corresponding to the still image compression is allocated to the GPU. For example, in case of compressing an image corresponding to the changed region through the paletted PNG still image compression technique as the processing results of the unit processes corresponding to the image analysis and the still image compression technique determination, performing the still image compression through the GPU may be more efficient than performing the still image compression through the CPU because there is the repetition of simple calculations or a calculation to be processed in parallel. Therefore, if a unit process corresponding to the still image compression is allocated to the GPU, the image data to be compressed, that is, the image data corresponding to the changed region, may be delivered to the GPU.

The sending unit 2130 performs a cloud streaming service based on a still image by sending the still-image-encoded changed region to a user. Namely, by transmitting the changed region, compressed through encoding, to a user's terminal device, the user can experience as if an application is being executed at the user's terminal device.

The storage unit 2140 stores various kinds of the above-discussed information created in a cloud streaming service process according to an embodiment of this invention.

According to an embodiment, the storage unit 2140 may be formed independently from the cloud streaming server 2010 and support a function for the cloud streaming service. In this case, the storage unit 2140 may operate as separate high-capacity storage and include a control function for the operation.

In addition, the above-discussed cloud streaming server 2010 may be also implemented by means of one or more servers.

Meanwhile, the cloud streaming server 2010 has a memory that may store information. In an embodiment, the memory is a computer-readable medium. The memory may be a volatile memory unit in one embodiment and a nonvolatile memory unit in another embodiment. In an embodiment, the storage unit is a computer-readable medium. In various different embodiments, the storage unit may include a hard disk device, an optical disk device, or any other high-capacity storage device.

Figure 22:
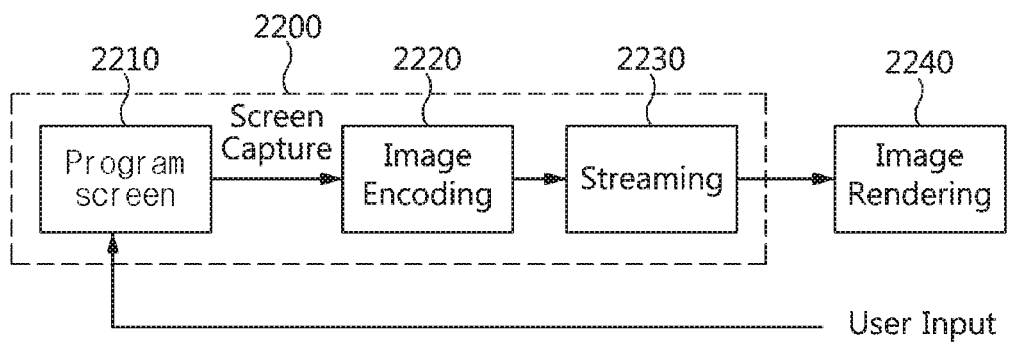
FIG. 22 is a diagram illustrating yet another example of a cloud streaming system based on a still image.

FIG. 22 is a diagram illustrating yet another example of a cloud streaming system based on a still image.

Referring to FIG. 22, a server 2200 may execute a program screen 2210 in response to a user input received from the user's terminal device and perform a screen capture. In this case, the server 2200 may be a cloud streaming server or a web application server. A process of executing the program screen 2210 and performing a screen capture may correspond to an operation flow of the capture unit 2110 shown in FIG. 21.

The server 2200 may perform an image encoding 2220 of the captured program screen 2210 through a still image compression technique. In this case, a process of performing the image encoding 2220 may correspond to an operation flow of the encoding unit 2120 shown in FIG. 21.

In this case, the server may capture a changed region only by comparing a changed frame with a previous frame. Also, the server may divide an encoding process for the changed region into a plurality of unit processes, allocates at least one of the unit processes to a graphics processing unit (GPU), allocates remaining unit processes to a central processing unit (CPU), and performs the encoding process for a still image encoding of the changed region.

Thereafter, the server 2200 may perform streaming 2230 of the still-image-encoded changed region to the user's terminal device, thus providing a cloud streaming service based on a still image. In this case, a process of performing the streaming 2230 may correspond to an operation flow of the sending unit 2130 shown in FIG. 21.

Thereafter, the user's terminal device performs rendering 2240 of received data and thereby display the program screen 2210 to the user as if the program screen executed in an application in response to a user input is executed at the user's terminal device.

Figure 23:
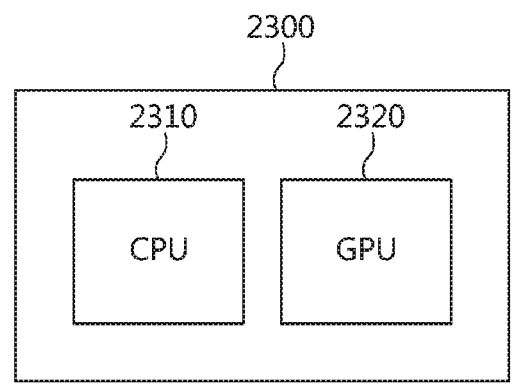
FIG. 23 is a diagram illustrating an encoding processing unit according to another embodiment of the present invention.

FIG. 23 is a diagram illustrating an encoding processing unit according to another embodiment of the present invention.

Referring to FIG. 23, the encoding processing unit according to another embodiment of this invention may be classified into a central processing unit (CPU) 2310 and a graphics processing unit (GPU) 2320.

The CPU 2310, which is an essential part of a computer, may decode instructions and perform arithmetic logic operations or data processing. Therefore, a computation speed, the amount of data to be handled at one time, the size of a main memory region, and the like may greatly depend on the performance of the CPU. In case of encoding the changed region through the CPU, it is possible to directly perform encoding without delivering data for encoding to any other unit, thus incurring no cost associated with data delivery. However, if one or more of the repetition of simple calculations and a calculation process suitable for a parallel processing is contained in a process of encoding an image corresponding to the changed region, it may take a long time to perform the encoding through the CPU 2310. Particularly, in case of performing the encoding through the paletted PNG still image compression technique, the encoding time may be increased inefficiently because it is required to construct a color histogram for each frame image, create a palette based on the color histogram, and perform color quantization.

The GPU 2320 is a processor, dedicated to 3D graphics operations, which has been developed to handle various light source effects and texture representation techniques so as to make a display screen more realistic after the introduction of 3D graphics. Even though there is the repetition of simple calculations or a calculation process suitable for a parallel processing, the server may effectively encode the changed region through processing capability of the GPU. However, encoding of the changed region through the GPU needs to receive data for encoding from the CPU and then return encoded data to the CPU. This may incur an additional cost.

As shown in FIG. 23, the CPU 2310 and the GPU 2320 may independently exist in a server 2300. Contrary to FIG. 23, the CPU 2310 and the GPU 2320 may be united into a single apparatus, or the GPU 2320 may be contained in the GPU 2310. Any other configuration may be possible.

In addition, the CPU 2310 and the GPU 2320 may be connected with each other so as to transmit and receive data.

Figure 24:
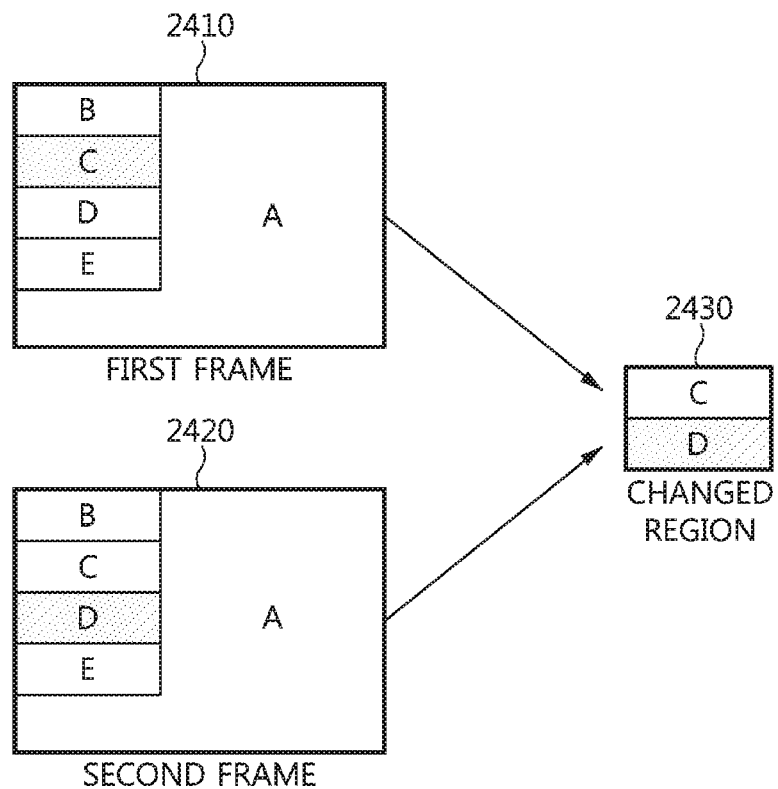
FIG. 24 is a diagram illustrating a process of capturing a changed region in a cloud streaming service according to yet another embodiment of the present invention.

FIG. 24 is a diagram illustrating a process of capturing a changed region in a cloud streaming service according to yet another embodiment of the present invention.

Referring to FIG. 24, the cloud streaming service based on a still image according to yet another embodiment of this invention may compare the first frame 2410 with the second frame 2420 and then capture and encode a changed region 2430 only.

For example, let's suppose that regions B, C, D and E in the first and second frames 2410 and 2420 are menu displays. In the first frame 2410, a cursor is located at the region C, so that the region C may be highlighted to be distinguished from the other regions B, ID and E. In the second frame 2420, the cursor is moved from the region C to the region D, so that the region D may be highlighted to be distinguished from the other regions B, C and E.

In this case, as the result of comparison between the first and second frames 2410 and 2420, the regions C and D only may be captured as the changed region 2430. Also, the server may divide an encoding process for the changed region into a plurality of unit processes, allocate at least one of the unit processes to a graphics processing unit (GPU), allocate remaining unit processes to a central processing unit (CPU), and perform the encoding process for a still image encoding of the changed region 2430.

A typical cloud streaming service may perform encoding by capturing all frames, corresponding to a frame rate, including the first and second frames 2410 and 2420 which are certainly changed. However, the cloud streaming service based on a still image captures only the changed region 2430 and encodes it through the still image compression technique, thus improving the efficiency of a service in comparison with the typical cloud streaming service that unnecessarily captures many frames and the entire screen of such a frame.

Figure 25:
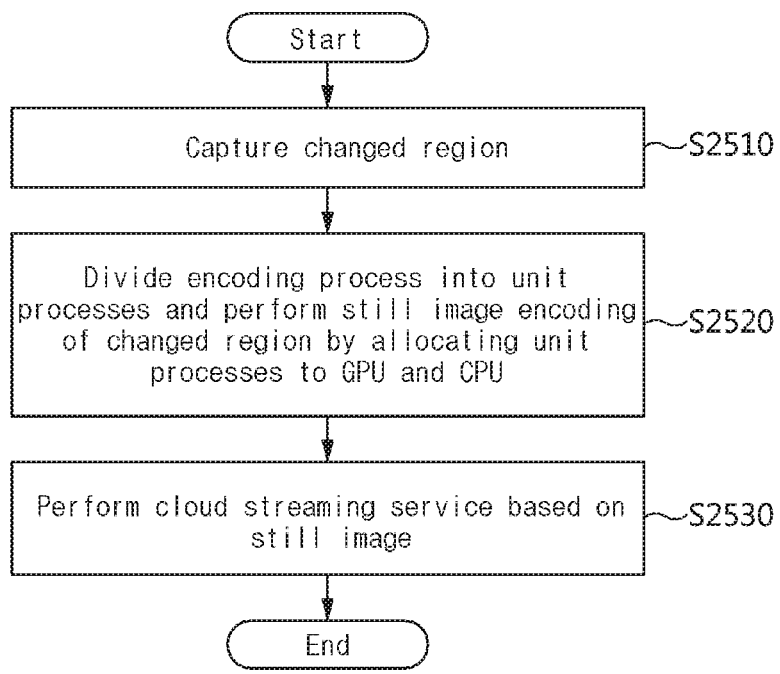
FIG. 25 is a flow diagram illustrating a cloud streaming service method through a task separation of an encoding processing unit according to an embodiment of the present invention.

FIG. 25 is a flow diagram illustrating a cloud streaming service method through a task separation of an encoding processing unit according to an embodiment of the present invention.

Referring to FIG. 25, the cloud streaming service method through a task separation of an encoding processing unit according to an embodiment of this invention captures a changed region contained in a changed frame (S2510). The cloud streaming technique based on the video codec may capture and encode all frames corresponding to a screen on which an application is running. However, if there is a smaller change between frames on the screen, the server may perform a still image encoding by capturing only a changed region of a changed frame in comparison with a previous frame. Therefore, the user's terminal device can fixedly display an unchanged region and dynamically display a changed region only.

In this case, a certain region of a screen area corresponding to the changed frame that is different from a screen area corresponding to the previous frame may be captured as a changed region. For example, if a region of the changed frame changed from a corresponding region of the previous frame is a region A, the region A only in the screen area of the changed frame may be captured as the changed region. Depending on input signals entered at the user's terminal device, such a changed region may have various sizes, and an image corresponding to the changed region may have various types.

In this case, a section having a smaller frame change may be detected in all frames to be transmitted to the user's terminal device, and the changed region may be captured in the detected section.

At this time, by identifying an event type of an application occurring from the user's terminal device, such a section having a smaller frame change may be detected. For example, depending on an input signal of the user's terminal device, the event type of the application may be determined. Depending on an input signal, a static event such as a menu, an option, or a notification window having a smaller frame change when an application is executed, or a dynamic event such as a video playback or a game play having a frequently changed frame may occur. It is therefore possible to identify an event type from an input signal of the user's terminal device and, if the event type is a static event, to detect a section having a smaller frame change from the all frames corresponding to the event.

Additionally, the cloud streaming service method through a task separation of an encoding processing unit according to an embodiment of this invention divides an encoding process for the changed region into a plurality of unit processes, allocates at least one of the unit processes to a graphics processing unit (GPU), allocates remaining unit processes to a central processing unit (CPU), and performs the encoding process for a still image encoding of the changed region (S2520).

When the cloud streaming server encodes an image corresponding to the changed region, a typical service method using the CPU only fails to use the entire available resources of the cloud streaming server and thus may cause the degradation of a service quality due to a time delay in image encoding. Therefore, in order to solve such a problem of the typical service method, the present invention divides an encoding process into a plurality of unit processes and properly allocates the respective unit processes to the CPU and the GPU.

In this case, each of the unit processes may correspond to one of an image analysis, a still image compression technique determination, a still image compression, and a compression data collection. The image analysis may be a process of analyzing the feature of an image corresponding to the changed region. For example, the encoding unit may analyze image features such as an image size, an image resolution and an image type and then use them as data for performing an efficient encoding.

Additionally, by performing a unit process corresponding to the still image compression technique determination, the encoding unit may use the resource of the cloud streaming server more efficiently when performing the compression of the changed region. Thereafter, the encoding unit may perform a process corresponding to the compression data collection by using the result of a still image compression of at least one image corresponding to the changed region.

In this case, the encoding unit may allocate a unit process corresponding to the still image compression to the GPU, based on the processing results corresponding to the image analysis and the still image compression technique determination. For example, as the processing results corresponding to the image analysis and the still image compression technique determination, a paletted PNG (portable network graphics) still image compression technique may be determined as a still image compression technique for encoding the changed region. In this case, a process of performing the still image encoding through the paletted PNG still image compression technique may include the repetition of simple calculations or a calculation process to be processed in parallel. Therefore, in this case, by allocating a unit process for performing the still image compression to the GPU among the unit processes, the encoding unit may save an encoding time and thus efficiently use the resources of the cloud streaming server.

Additionally, the encoding unit may perform a unit process corresponding to the still image compression through the GPU, depending on the system setting and regardless of the processing results corresponding to the image analysis and the still image compression technique determination. If the cloud streaming system is formed of the CPU only, all processes should be performed using the CPU. This may cause a high possibility of latency delay when the cloud streaming service is provided to a user's terminal. Therefore, by having one or more CPUs, performing a unit process corresponding to the still image compression through the GPU, and delivering a processing result to the CPU, the encoding unit may reduce a management cost of the cloud streaming system and also reduce the latency delay.

In this case, for an image corresponding to the changed region, the still image compression may include one or more processes of a color histogram construction, a palette creation, a palette-based original color quantization, and a palette-based encoding. The color histogram construction may be performed to create a palette for the image corresponding to the changed region. The palette creation may be a process of creating a palette with the minimal loss relative to the original image, i.e., the image corresponding to the changed region, by using a color histogram. Based on the created palette, the encoding unit may perform the original color quantization by replacing the color of the image corresponding to the changed region with the color corresponding to the palette, and then perform the palette-based encoding.

The GPU may deliver the processing result corresponding to the still image compression to the CPU. For example, the GPU may perform a unit process corresponding to the still image compression as to the changed regions contained in the plurality of changed frames, and deliver each processing result to the CPU for performing a unit process corresponding to the compression data collection. Like this, when the encoding process is divided into unit processes each of which is performed by one of the CPU and the GPU, any resource consumption cost for delivery of a processing result may occur additionally. However, because the resource efficiency benefit obtained from a divided encoding process is greater than the resource consumption cost that may be incurred additionally, the above encoding method may be more efficient.

In this case, the CPU may perform a unit process corresponding to the compression data collection by using the processing result corresponding to the still image compression. For example, if there are a plurality of processing results corresponding to the still image compression created through the GPU, the encoding unit may collect the respective processing results, i.e., compression data. Because this invention has an object of providing a cloud streaming service based on a still image to a user's terminal device by performing an encoding process, the encoding unit may collect a plurality of compression data and perform the encoding process so as to provide the service to the user's terminal device.

If a unit process corresponding to the still image compression is allocated to the GPU, the CPU may deliver image data corresponding to the changed region to the GPU. Depending on the processing results of the unit processes corresponding to the image analysis and the still image compression technique determination, it may be determined whether the unit process corresponding to the still image compression is allocated to the GPU. For example, in case of compressing an image corresponding to the changed region through the paletted PNG still image compression technique as the processing results of the unit processes corresponding to the image analysis and the still image compression technique determination, performing the still image compression through the GPU may be more efficient than performing the still image compression through the CPU because there is the repetition of simple calculations or a calculation to be processed in parallel. Therefore, if a unit process corresponding to the still image compression is allocated to the GPU, the image data to be compressed, that is, the image data corresponding to the changed region, may be delivered to the GPU.

Additionally, the cloud streaming service method through a task separation of an encoding processing unit according to an embodiment of this invention performs a cloud streaming service based on a still image by sending the still-image-encoded changed region to a user (S2530). By transmitting the changed region, compressed through encoding, to a user's terminal device, the user can experience as if an application is being executed at the user's terminal device.

Meanwhile, although not shown in FIG. 25, the cloud streaming service method through a task separation of an encoding processing unit according to an embodiment of this invention may store various kinds of information created in a cloud streaming service process.

FIG. 26 is a flow diagram illustrating in detail a cloud streaming service method through a task separation of an encoding processing unit according to an embodiment of the present invention.

Referring to FIG. 26, in the cloud streaming service method through a task separation of an encoding processing unit according to an embodiment of this invention, a cloud streaming server captures a changed region contained in a changed frame in comparison with a previous frame (S2610).

Thereafter, the server divides the encoding process for the changed region into a plurality of unit processes (S2620).

Thereafter, the server analyzes an image corresponding to the changed region by using the CPU (S2630).

Thereafter, the server determines a still image compression technique corresponding to the changed region by using the CPU (S2640).

Thereafter, depending on the determined still image compression technique, the server allocates a unit process corresponding to a still image compression to the GPU (S2650).

Thereafter, using the CPU, the server delivers image data corresponding to the changed region to the GPU (S2660).

Thereafter, the server performs the still image compression by using the GPU and delivers a processing result corresponding to the still image compression to the CPU (S2670).

Thereafter, using the CPU, the server performs a unit process corresponding to a compression data collection by using the processing result corresponding to the still image compression (S2680).

Thereafter, the server delivers the still-image-encoded changed region to a user (S2690).

The computer-readable storage medium, having recorded thereon, suitable for storing computer program command languages and data, includes magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), a flash memory, an erasable programmable ROM (EPROM), and an electrically EPROM (EEPROM). A processor and memory may be supplemented by or integrated with specific-purpose logical circuit. Program commands may include high-class language codes, which can be executed in a computer by using an interpreter, as well as machine codes made by a compiler. The aforementioned hardware device may be configured to operate as one or more software modules in order to perform the operation of this invention, and vice versa.

While this disclosure contains many specific implementation details, these should not be construed as limitations on the scope of the invention or of what may be claimed, but rather as descriptions of features that may be specific to particular embodiments of particular invention. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

While the present invention has been particularly shown and described with reference to an exemplary embodiment thereof, it will be understood by those skilled in the art that various changes in form and details may be made therein without departing from the spirit and scope of the invention as defined by the appended claims.

INDUSTRIAL APPLICABILITY

The present invention may determine and capture, as a changed region, a rectangular region containing changed pixels and having the minimum area by using a differential frame between a previous frame and a current frame, select a still image compression technique in accordance with an image type determined by considering one or more of the number of colors of an image corresponding to the changed region and a standard deviation of pixel values of the image, perform a still image encoding of the changed region corresponding to one frame by using the selected still image compression technique, and perform a cloud streaming service based on a still image by sending the still-image-encoded changed region to a user. Further, this invention may maximize the streaming compression efficiency through a cloud streaming service using the still image compression technique and also provide a faster cloud streaming service to more users over the same hand. Therefore, the cloud streaming service provider can provide an efficient service to users while saving resources needed for band expansion.

Additionally, the present invention may capture a changed region contained in a changed frame, determines an encoding technique by considering whether there is image feature information corresponding to the changed region, perform a still image encoding of the changed region by using the encoding technique, and perform a cloud streaming service based on a still image by sending the still-image-encoded changed region to a user. Further, by determining the encoding technique through the image feature information when performing the encoding for the cloud streaming server, this invention may save resources of a cloud streaming server, typically required for image processing, and thereby provide a more effective cloud streaming service.

Additionally, the present invention may capture a changed region contained in a changed frame in comparison with a previous frame, select an encoding processing unit by considering one or more of an image feature and an image resolution corresponding to the changed region, perform a still image encoding of the changed region corresponding to one frame by using the encoding processing unit, and perform a cloud streaming service based on a still image by sending the still-image-encoded changed region to a user. Further, this invention may increase the efficiency of utilizing resources of a cloud streaming server through the cloud streaming service using the selective encoding processing unit, thereby reducing a processing cost for providing the cloud streaming service.

Additionally, the present invention may capture a changed region contained in a changed frame, compress the changed region by using a graphics processing unit (GPU), divide an encoding process for the changed region into a plurality of unit processes, allocate at least one of the unit processes to the GPU, allocate remaining unit processes to a central processing unit (CPU), perform the encoding process for a still image encoding of the changed region, and perform a cloud streaming service based on a still image by sending the still-image-encoded changed region to a user. Further, this invention may save resources of a cloud streaming server through the cloud streaming service based on a process separation of the encoding processing unit, thereby reducing the overall cost for providing the cloud streaming service.

The invention claimed is:

1. A cloud streaming server comprising: a memory;
a processor configured to execute instructions stored in the memory and to: communicate with a user device via a network;
determine a changed region of a current frame changed from a previous frame by comparing the current frame with the previous frame;
capture the changed region;
perform a still image encoding of the changed region corresponding to one frame by using a still image compression technique: and
perform a cloud streaming service based on a still image by sending the still-image-encoded changed region to the user device,
wherein the processor is further configured to:
identify an application type of the user device from an input signal of the user device, wherein the application type of the user device comprises a static type and a dynamic type;
detect a section having a less frame change than a predetermined value from among all frames transmitted to the user device when the application type of the user device is identified to be the static type;
capture the changed region in the detected section; and
select the still image compression technique in accordance with an image type determined by considering one or more of the number of colors of an image corresponding to the changed region and a standard deviation of pixel values of the image.

2. The cloud streaming server of claim 1, wherein the processor is further configured to:
calculate a differential frame between the previous frame and the current frame; and
determine the changed region by using the differential frame.

3. The cloud streaming server of claim 2, wherein the processor is further configured to determine the changed region by detecting a changed pixel of the current frame changed from the previous frame through a scanning of the differential frame.

4. The cloud streaming server of claim 3, wherein the processor is further configured to determine the changed region containing changed pixels detected through a horizontal scanning and a vertical scanning of the differential frame.

5. The cloud streaming server of claim 4, wherein the processor is further configured to:
obtain a first vertical coordinate element from a changed pixel firstly detected through the horizontal scanning of the differential frame on row-by-row basis from top to bottom;
obtain a second vertical coordinate element from a changed pixel firstly detected through the horizontal scanning of the differential frame on a row-by-row basis from bottom to top;
obtain a first horizontal coordinate element from a changed pixel firstly detected through the vertical scanning of the differential frame on a column-by-column basis from left to right;
obtain a second horizontal coordinate element from a changed pixel firstly detected through the vertical scanning of the differential frame on a column-by-column basis from right to left; and
determine, as the changed region, a rectangular region containing a changed pixel corresponding to a coordinate formed by a pair of one of the horizontal coordinate elements and one of the vertical coordinate elements.

* * * * *